(12) United States Patent
Walker et al.

(10) Patent No.: US 6,683,979 B1
(45) Date of Patent: Jan. 27, 2004

(54) IMAGE DATA COMPRESSION AND DECOMPRESSION

(75) Inventors: Christopher A. Walker, Gilroy, CA (US); Marc A. Schafer, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/458,011

(22) Filed: Dec. 10, 1999

(51) Int. Cl.$^7$ ................................................. G06K 9/00
(52) U.S. Cl. ........................................ 382/166; 358/539
(58) Field of Search ............................... 382/166–167, 382/162, 164, 232–233, 244, 245; 358/539, 1.9, 1.15, 443, 426.02; 375/240.01, 240.24; 345/582–583, 589, 600–605, 597, 591

(56) References Cited

U.S. PATENT DOCUMENTS

| | | | |
|---|---|---|---|
| 5,047,853 A | * | 9/1991 | Hoffert et al. ......... 375/240.01 |
| 5,377,018 A | * | 12/1994 | Rafferty ................. 358/426.02 |
| 5,668,932 A | * | 9/1997 | Laney ......................... 358/1.9 |

OTHER PUBLICATIONS

Campbell et al., "Two Bit/Pixel Full Color Encoding," Computer Graphics, vol. 20, No. 4, Aug. 1986, pp. 215–223.

* cited by examiner

Primary Examiner—Leo Boudreau
Assistant Examiner—Ishrat Sherali
(74) Attorney, Agent, or Firm—Sterne, Kessler, Goldstein & Fox P.L.L.C.

(57) ABSTRACT

System, method and apparatus for compressing and decompressing image data. In an embodiment, a color cell is compressed by: defining at least four luminance levels of the color cell; generating a bitmask for the color cell, the bitmask having a plurality of entries each corresponding to a respective one of the pixels, each of the entries for storing data identifying one of the luminance levels associated with a corresponding one of the pixels; calculating a first average color of pixels associated with a first one of the luminance levels; calculating a second average color of pixels associated with a second one of the luminance levels; and storing the bitmask in association with the first average color and the second average color. In a second embodiment of the present invention, a color cell is compressed by: determining a luminance value (Y) for each pixel of the color cell; selecting a maximum luminance value ($Y_{MAX}$) and a minimum luminance value ($Y_{MIN}$) for the color cell; subdividing the interval $Y_{MAX}$ to $Y_{MIN}$ into at least two approximately equal subintervals; generating at least one bitmask that associates each pixel of the color cell with one subinterval; and determining a representative color value for each subinterval from the pixels of the color cell associated with the subinterval. Compression can be performed at a real-time rate. The present invention can support the compression of luminance, intensity and alpha textures.

20 Claims, 11 Drawing Sheets

IMAGE DATA COMPRESSION AND DECOMPRESSION

CROSS REFERENCE TO RELATED APPLICATION

This application contains subject matter related to commonly owned, U.S. patent application Ser. No. 09/162,244, filed Sep. 28, 1998, titled "Method of and Apparatus for Compressing and Uncompressing Image Data," which is herein incorporated by reference in its entirety.

BACKGROUND OF THE INVENTION

1. Field of the Invention

The present invention relates to the field of computer graphics. More specifically, the present invention relates to a method of and apparatus for compressing and uncompressing (or decompressing) image data in a computer system.

2. Related Art

Computer graphics is used in a wide variety of applications, such as in business, science, animation, simulation, computer-aided design, process control, electronic publishing, gaming, medical diagnosis, etc. In those applications, three-dimensional (3D) objects are displayed on a computer screen by using a number of polygons to represent the three-dimensional objects. In order to portray a more realistic real-world representation, texture mapping is often applied. Texture mapping refers to techniques for using two-dimensional (2D) or three-dimensional (3D) texture images, or texture maps, for adding surface details to areas or surfaces of these 3D graphical objects. For example, given a featureless solid cube and a texture map defining a wood grain pattern, texture mapping techniques may be used to map the wood grain pattern onto the cube. The resulting image is that of a cube that appears to be made of wood. In another example, vegetation and trees can be added by texture mapping to an otherwise barren terrain model in order to portray a landscape filled with vegetation and trees.

In computer systems having dedicated graphics hardware, images for use in texture mapping are typically stored in memory in the form of a collection of tiles. These tiles are addressed and managed as a virtually contiguous region of address space by a two-dimensional index (S, T). In other words, this memory management scheme treats a texture map as an array of small, contiguous tiles each including a matrix of texels. Thereby, memory management issues, such as caching, virtual-to-physical mapping, swapping, etc. are more easily executed.

In order to utilize computer resources more efficiently, computer graphics systems typically include a graphics co-processor for offloading processing burdens from the CPU of the computer system, and a texture memory for storing texture data. Moreover, in order to further accelerate the texture mapping process, a special cache memory, also known as a texture cache, may also be implemented in the computer graphics systems for providing faster access to and temporary storage of frequently used tiles of texture data. In these computer systems, the texture data is frequently transferred between these memories. The bandwidth for transferring texture data between these memories, thus, becomes a critical factor in determining the texture mapping performance of such systems. Additionally, the memories themselves are valuable resources. Therefore, it would be advantageous to store and transfer texture data in a compressed format.

The need for a method of compressing texture images also arises in computer systems without a dedicated texture cache memory. In those systems, texture images are rendered directly from the system memory. That method of rendering, however, places significant burdens on system memory bandwidth. In addition to passing texture data and other image data, the memory bus must also handle access to the system memory by the operating system and the application programs. Therefore, in order to alleviate this problem, it is would also be advantageous to store and transfer compressed texture data such that the burden on system memory bandwidth is minimized.

A further need for a method of compressing images arises in network systems. Often, a computer network has only one or at most a few network graphic machines that are capable of rendering complex images, such as three-dimensional scientific graphs or engineering drawings. It would be advantageous if these complex images could be rendered on a network graphics machine and sent in a compressed data format over the network to a user for real-time display on the users personal computer.

Conventional methods of compressing image data, however, are not suitable for compressing complex or texture images. For instance, these conventional methods introduce significant amounts of visual artifacts, such as color "jaggies," in the image data. These visual artifacts, while hardly noticeable in non-3D applications, are magnified when conventionally compressed texture images are used in texture mapping. Further, conventional compression algorithms, such as the color cell compression (CCC) algorithm, make use of a color look-up table (LUT) for storing representative colors of the image. Because color LUTs can be quite large, and given the limited system memory bandwidth, the overall performance of the texture mapping process would be significantly impeded if conventional algorithms such as the CCC algorithm are used to compress texture data.

Other well known compression schemes such as the JPEG or MPEG compression schemes produce good quality compression but are mathematically complex and require considerable amounts of hardware to implement. This high hardware cost makes these schemes unsuitable for texture compression. For the network transport case, where the implementation can be in software, these other schemes are too slow to maintain interactive frame rates.

Therefore, what is needed is a method of and apparatus for compressing and uncompressing color images with minimal information loss. What is also needed is a method of and apparatus for compressing and uncompressing color images without color look-up tables. What is yet further needed is a method of and apparatus for compressing and uncompressing texture data to be used in texture mapping. For the network transfer case, what is needed is a method that can be implemented in software and still maintain interactive frame rates.

SUMMARY OF THE INVENTION

The present invention provides for a method of and apparatus for compressing and uncompressing image data. According to one embodiment of the present invention, the method of compressing a color cell comprises the steps of: defining at least four luminance levels of the color cell; generating at least two bitmasks for the color cell, generating a first base color representative of pixels associated with a first one of the luminance levels; generating a second base color representative of pixels associated with a second one of the luminance levels; and storing the bitmasks in association with the first base color and the second base color.

According to the present embodiment, the bitmasks each includes a plurality of entries each corresponding to a respective one of the pixels. Further, each entry is for storing data that identifies the luminance levels associated with the pixels. The present invention is particularly applicable to compress texture data such that the texture data can be more efficiently cached and moved during texture mapping.

In accordance with the present embodiment, the step of defining the luminance levels includes the steps of: calculating a mean luminance value for all pixels within the color cell; calculating an upper-mean luminance value for pixels having luminance values higher than the mean luminance value; and calculating a lower-mean luminance value for pixels having luminance values lower than the mean luminance value. In the present embodiment, the mean luminance value, the upper-mean luminance value, and the lower-mean luminance value partition the plurality of pixels into four different luminance levels including a highest luminance level, a high luminance level, a low luminance level, and a lowest luminance level. According to one embodiment, the first base color is computed by averaging the color values of all the pixels associated with the highest luminance level, and the second average color is computed by averaging the color values of all the pixels associated with the lowest luminance level.

In a second embodiment of the present invention, the method of compressing a color cell comprises the steps of: determining a luminance value (Y) for each pixel of the color cell; selecting a maximum luminance value ($Y_{MAX}$) and a minimum luminance value ($Y_{MIN}$) for the color cell; subdividing the interval $Y_{MAX}$ to $Y_{MIN}$ into at least two approximately equal subintervals; generating at least one bitmask that associates each pixel of the color cell with one subinterval; and determining an average color value for each subinterval from the pixels of the color cell associated with the subinterval.

In an example of this second embodiment, the step subdividing the interval $Y_{MAX}$ to $Y_{MIN}$ into at least two approximately equal subintervals comprises the step of subdividing the interval $Y_{MAX}$ to $Y_{MIN}$ into two approximately equal subintervals. In this example embodiment, a first subinterval is defined as $Y_{MAX}$ to $0.5(Y_{MAX}+Y_{MIN})$ and a second subinterval is defined as $0.5(Y_{MAX}+Y_{MIN})$ to $Y_{MIN}$. In another example of this embodiment, the interval $Y_{MAX}$ to $Y_{MIN}$ is subdivided into four approximately equal subintervals: $Y_{MAX}$ to $0.25(3Y_{MAX}+Y_{MIN})$, $0.25(3Y_{MAX}+Y_{MIN})$ to $0.5(Y_{MAX}+Y_{MIN})$, $0.5(Y_{MAX}+Y_{MIN})$ to $0.25(Y_{MAX}+3Y_{MIN})$; and $0.25(Y_{MAX}+3Y_{MIN})$ to $Y_{MIN}$.

In still another embodiment of the present invention, the methods of the present invention are implemented using a distributed graphic system. The distributed graphics system comprising means for compressing color cells for transmission over a network and means for decoding received compressed color cell for display by a computer. A graphics machine of this embodiment comprises both means for rendering an image and means for dividing the rendered image into color cells.

In one particular embodiment, the color cell includes a matrix of 4×4 pixels, the bitmasks include thirty-two bits and each of the base colors includes sixteen bits such that a compression ratio of four bits per pixel is achieved. In that embodiment, the present invention can be modified to support the compression of luminance, intensity and alpha textures.

In furtherance of one embodiment of the present invention, the method of restoring compressed image data comprises the steps of reading at least two base colors from the compressed image data; generating at least two additional colors from the base colors; and reconstructing the color cell based on the bitmasks and the base colors and the additional colors. In one embodiment, the color cell is reconstructed by assigning each pixel one of the colors according to the pixel's luminance level.

Embodiments of the present invention include the above and further include a computer readable memory for storing compressed texture data which comprises at least two bitmasks each having a plurality of entries each corresponding to a texel of a texture map, each of the entries for storing data identifying one of at least four luminance levels associated with a corresponding one of the texels; a first color of texels associated with a first one of the luminance levels; and a second color of texels associated with a second one of the luminance levels, wherein the bitmasks, the first color value and the second color value are for being retrieved by a computer system to reconstruct the uncompressed color cell from the compressed texture data during texturemapping.

BRIEF DESCRIPTION OF THE FIGURES

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "generating", "associating", "assigning" or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

Computer System Environment of the Present Invention

Figure 1:
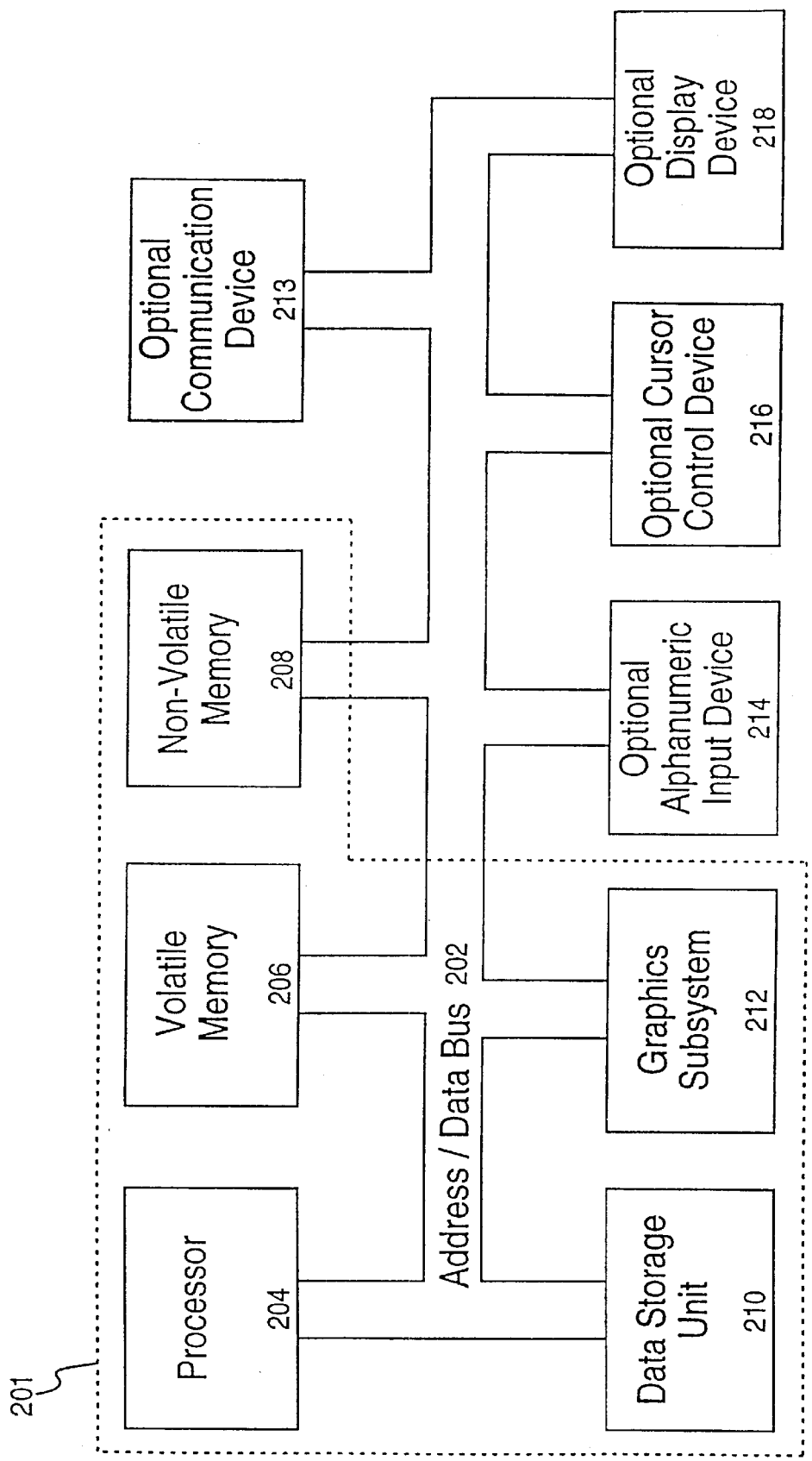
FIG. 1 is a block diagram illustrating an exemplary computer system used as part of a computer graphics system in accordance with one embodiment of the present invention.

With reference to FIG. 1, portions of the present invention are comprised of computer-readable and computer executable instructions which reside, for example, in computer-usable media of a computer system. FIG. 1 illustrates an exemplary computer system 201 used as a part of a computer graphics system in accordance with one embodiment of the present invention. It is appreciated that system 201 of FIG. 1 is exemplary only and that the present invention can operate within a number of different computer systems including general purpose computer systems, embedded computer systems, and stand alone computer systems specially adapted for generating 3-D graphics.

Computer system 201 includes an address/data bus 202 for communicating information, a central processor 204 coupled with bus 202 for processing information and instructions, a volatile memory 206 (e.g., random access memory RAM) coupled with the bus 202 for storing information and instructions for the central processor 204 and a non-volatile memory 208 (e.g., read only memory ROM) coupled with the bus 202 for storing static information and instructions for the processor 204. Computer system 201 also includes a data storage device 210 ("disk subsystem") such as a magnetic or optical disk and disk drive coupled with the bus 202 for storing information and instructions. Data storage device 210 can include one or more removable magnetic or optical storage media (e.g., diskettes, tapes) which are computer readable memories. Memory units of system 201 include 206, 208 and 210. Computer system 201 can also include a graphics subsystem 212 (e.g., graphics adapter) coupled to the bus 202 for providing additional graphics processing power.

Computer system 201 can further include a communication device 213 (e.g., a modem, or a network interface card NIC) coupled to the bus 202 for interfacing with other computer systems. Also included in computer system 201 of FIG. 1 is an optional alphanumeric input device 214 including alphanumeric and function keys coupled to the bus 202 for communicating information and command selections to the central processor 204. Computer system 201 also includes an optional cursor control or directing device 216 coupled to the bus 202 for communicating user input information and command selections to the central processor 204. An optional display device 218 can also be coupled to the bus 202 for displaying information to the computer user. Display device 218 may be a liquid crystal device, other flat panel display, cathode ray tube, or other display device suitable for creating graphic images and alphanumeric characters recognizable to the user. Cursor control device 216 allows the computer user to dynamically signal the two dimensional movement of a visible symbol (cursor) on a display screen of display device 218. Many implementations of cursor control device 216 are known in the art including a trackball, mouse, touch pad, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. The present invention is also well suited to receiving inputs by other means such as, for example, voice commands.

Figure 2:
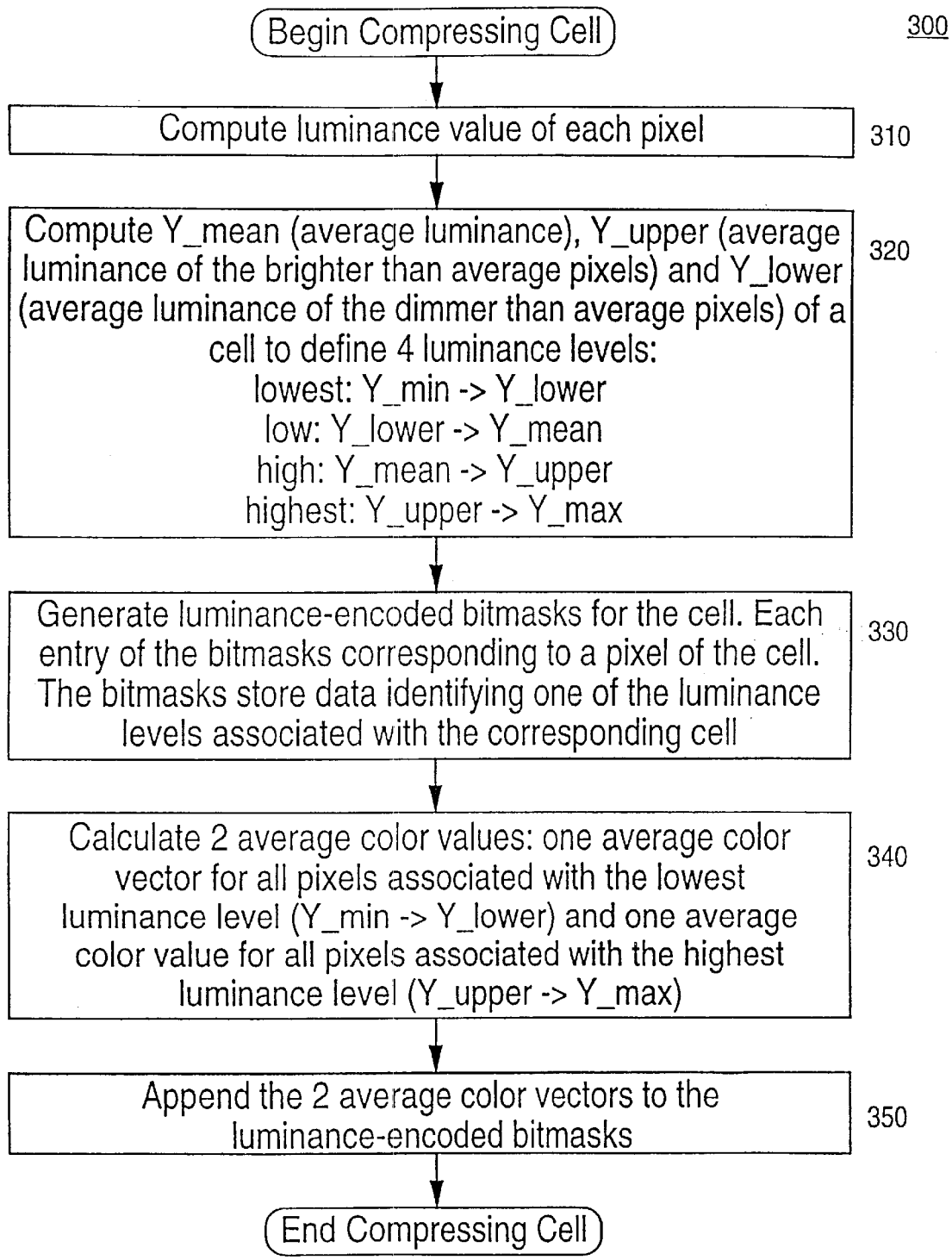
FIG. 2 is a flow diagram illustrating the process of compressing a color cell according to one embodiment of the present invention.

Method of Compressing Image Data According to One Embodiment of the Present Invention FIG. 2 is a flow diagram 300 illustrating a method of compressing a color cell according to one embodiment of the present invention. In the following discussion, image data is divisible into a matrix of color cells, and each color cell includes 4×4 pixels. In the present embodiment, there are twenty-four bits of color values (RGB8 format) per pixel. It should be appreciated that the number of pixels per cell, and the number of bits per pixel are arbitrary, and that the present invention may be applied to compress color cells of different sizes and having different number of bits per pixel.

At step 310, the luminance (Y) of each pixel of the cell is computed. In the present embodiment, the luminance value, Y, of a pixel is computed from its RGB values by summing the individual RGB values of that pixel. For example, the luminance value Y(i) of the i-th pixel of the color cell may be calculated by the formula:

$$Y(i)=0.299 \times R(i)+0.587 \times G(i)+0.114 \times B(i).$$

Then, at step 320, an average luminance value ($Y_{MEAN}$) is computed by summing the luminance value of all the pixels and by dividing the sum with the total number of pixels, n, of the cell. Thereafter, an upper-average luminance value ($Y_{UPPER}$) of the cell, and a lower-average luminance value ($Y_{LOWER}$) are computed. In the present embodiment, $Y_{UPPER}$ refers to the average luminance value of the pixels which have a higher luminance value than $Y_{MEAN}$, and $Y_{LOWER}$ refers to the average luminance value of the pixels which have a lower luminance value than $Y_{MEAN}$. An exemplary subroutine for calculating $Y_{MEAN}$, $Y_{UPPER}$, and $Y_{LOWER}$ is given below in pseudo-code.

Exemplary Subroutine for Calculating $Y_{MEAN}$, $Y_{UPPER}$, and $Y_{LOWER}$ compute-luminance( ){

```
y_mean = mean(y[i])      for i = 0 to 15;
y_upper = mean(y[i])     for all y[i] >= y_mean;
y_lower = mean(y[i])     for all y[i] < y_mean;
```

}

According to the present embodiment, the values $Y_{MEAN}$, $Y_{UPPER}$, and $Y_{LOWER}$, define four different luminance levels (or ranges) including a highest luminance level corresponding to pixels having luminance values higher than $Y_{UPPER}$ a high luminance level corresponding to pixels having luminance values $Y_{UPPER}$, a low luminance level corresponding to pixels between $Y_{UPPER}$ and $Y_{MEAN}$, having luminance values between $Y_{MEAN}$ and $Y_{LOWER}$, and a lowest luminance level corresponding to pixels having luminance values lower than $Y_{LOWER}$. For example, it may be determined that five pixels of the cell are associated with the highest luminance level because the luminance values of those five pixels are above $Y_{UPPER}$, and that three pixels are associated with the lowest luminance level because the luminance values of those three pixels are below $Y_{LOWER}$, etc. According to the present embodiment, these four different luminance levels are used to determine four different representative colors of the color cell.

With reference still to FIG. 2, at step 330, luminance-encoded bitmasks, are generated to represent the luminance level of each pixel of the color cell. In the present embodiment, the luminance-encoded bitmasks include two 4×4 bitmasks: one MSB bitmask and one LSB bitmask. For example, according to the present embodiment, if a pixel has a luminance value larger than or equal to $Y_{MEAN}$, the corresponding entry at the MSB bitmask is set to "1." If the pixel has a luminance value smaller then $Y_{MEAN}$, the corresponding entry at the MSB bitmask is set to "0." Similarly, if the pixel has a luminance value larger than or equal to $Y_{UPPER}$, the corresponding entries at the MSB bitmask and the LSB bitmask will be set to "1." If the pixel has a luminance value smaller than $Y_{LOWER}$, then the corresponding entries at the MSB bitmask and the LSB bitmask will be set to "0." Similarly, the LSB bitmask will be set to "1" if the luminance value of the corresponding pixel is higher than $Y_{LOWER}$ or $Y_{UPPER}$ and will be set to "0" if the luminance value of the corresponding pixel is lower than $Y_{LOWER}$ or $Y_{UPPER}$. An exemplary subroutine for generating the bitmasks is given below in pseudo-code.

Exemplary Subroutine for Generating Bitmasks
produce_luminance_encoded_bitmasks( ){

```
if (y[i] >= y upper) else      mask = 2'b11; /* highest luminance level */
if (y[i] >= y-mean)            mask = 2'b10; /* high luminance level */
else if (y[i] >= y_lower)      mask = 2'b01; /* low luminance level */
else                           mask = 2'b00; /* lowest luminance level */
```

}

At step 340, representative colors of the color cell are generated. In the present embodiment, one representative color, color_a, is generated for the pixels associated with the highest luminance level, and, another representative color, color_b, is generated for the pixels associated with the lowest luminance level. According to the present embodiment, representative colors color_a and color_b are generated by averaging the color values of the pixels for each of the luminance levels. Specifically, in the present embodiment, color_a is computed by averaging the color values of each pixel that has a luminance value larger than the upper-average luminance value $Y_{UPPER}$, and color_b is computed by average the color values of each pixel that has a luminance value smaller than the lower-average luminance value $Y_{LOWER}$. In the present embodiment, color_a and color_b each comprises 24 bits. However, in order to attain an even higher compression ratio, in the present embodiment, color_a and color_b are subsequently quantized to two RGB565 color values.

At step 350, the two RGB565 color values generated at step 350 are appended to the luminance-encoded bitmasks generated at 340, and the resultant encoded (or compressed) color cell is stored in a computer usable memory such as RAM 206 of computer system 201. In the present embodiment, the encoded color cell includes 64 bits (two 4×4 luminance-encoded bitmasks, and two RGB565 color values). In this way, a compression ratio of 4-bits/pixel is achieved. While the present invention has a lower compression ratio than conventional compression algorithms such as the CCC algorithm, the present invention has an advantage of higher image quality, and the present invention does not require a color look-up table. In addition, because compression and decompression is local to a 4×4 matrix of pixels, compression and decompression can be made to be very fast.

Figure 3:
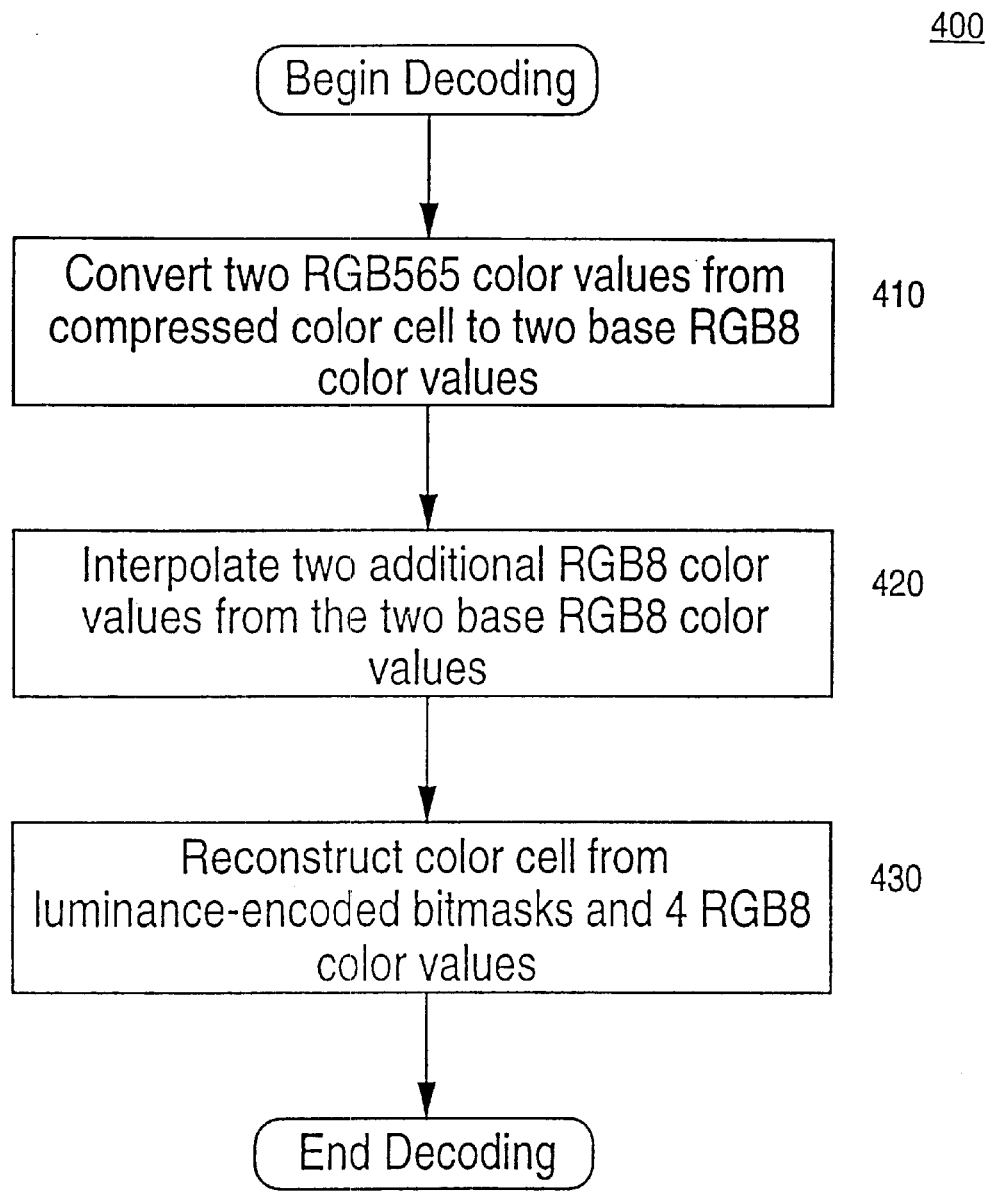
FIG. 3 is a flow diagram illustrating the process of restoring a color cell from data compressed by an encoding process such as the one illustrated in FIG. 2 in accordance with one embodiment of the present invention.

Method of Restoring Compressed Image Data
According to One Embodiment of the Present Invention FIG. 3 is a flow diagram 400 illustrating a method of restoring a color cell from data compressed by an encoding process such as the one illustrated in FIG. 2 in accordance with one embodiment of the present invention. Thus, in the following discussion, it is assumed that a color cell including 4×4 pixels has been compressed using the method described above to generate two 4×4 luminance-encoded bitmasks and two RGB565 color values. However, it should be noted that the present method of restoring (or decompressing) a color cell is entirely independent of the encoding process.

As illustrated in FIG. 3, at step 410, the first RGB565 color value and the second RGB565 color value of the compressed color cell are converted to two RGB8 color values color_a and color_b. This step can be easily carried out by bit-replication.

At step 420, two additional color values, color_a1 and color_b1, are interpolated from color_a and color_b. Particularly, in the present embodiment, color_a1 and color_b1 are interpolated from color_a and color_b according to the following formulas:

$$\text{color\_a1} = \frac{2}{3} \times \text{color\_a} + \frac{1}{3} \times \text{color\_b}$$

$$\text{color\_b1} = \frac{1}{3} \times \text{color\_a} + \frac{2}{3} \times \text{color\_b}$$

At step 430, the color cell is reconstructed from the luminance-encoded bitmasks and the four color values. In the present embodiment, the bitmasks contain data identifying the luminance level of each of the pixels of the color cell. Thus, in the present embodiment, the color cell is reconstructed by assigning each pixel one of the representative colors, color_a, color_b, color_a1, and color_b1, according to the pixel's luminance level. According to the present invention, the reconstructed color cell closely resembles the uncompressed color cell despite the high data compression ratio.

Figure 4:
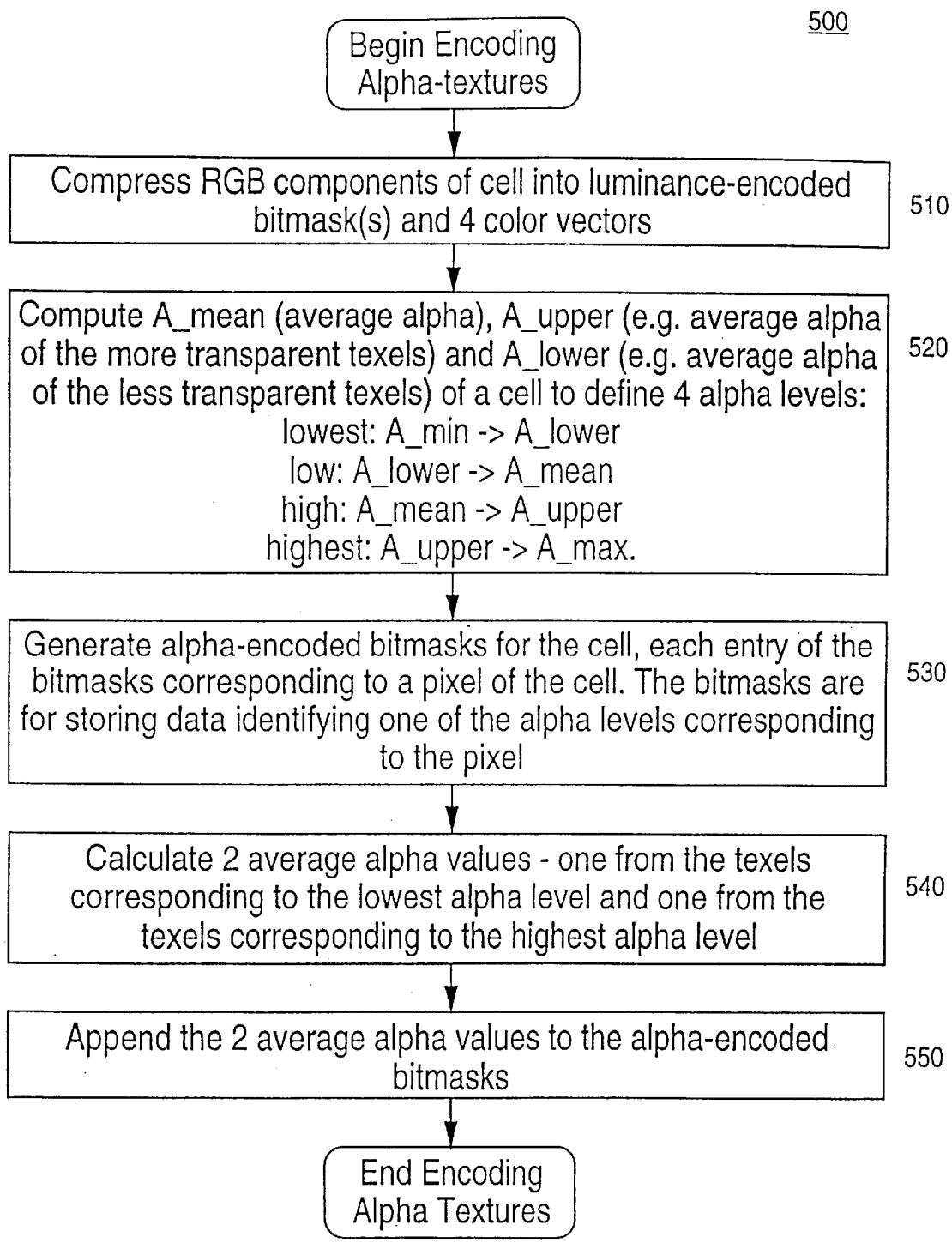
FIG. 4 is a flow diagram illustrating the process of compressing an alpha-texture color cell according to one embodiment of the present invention.

Method of Compressing Texture Data According to
One Embodiment of the Present Invention The present invention may be applied to compress image data such as alpha-textures. Alpha-textures refer to image data having a fourth color value α (in addition to RGB values) for creating images of transparent objects. FIG. 4 is a flow diagram 500 illustrating the method of compressing an alpha-texture color cell according to one embodiment of the present invention. In the present embodiment, alpha-texture data is divided into a matrix of color cells each including 4×4 texels. Further, there are 24-bits of color values and 8-bits of alpha-values per texel. It should be appreciated that the number of texels per cell and the number of bits per texel are arbitrary, and the present invention may be applied to compress color cells of different sizes and having different number of bits per texel.

As illustrated in FIG. 4, at step 510, the RGB values of each texel of the color cell are compressed. In the present embodiment, the RGB values of each texel are compressed according to the method described in flow diagram 300 of FIG. 2 to generate luminance-encoded bitmasks and two RGB5605 color values.

At step 520, an average alpha ($\alpha_{MEAN}$) of the cell is computed. In the present embodiment, $\alpha_{MEAN}$ is computed by summing the alpha values of all the texels and by dividing the sum with the total number of texels of the cell. Thereafter, an upper-average alpha value ($\alpha_{UPPER}$) of the cell, and a lower-average alpha value ($\alpha_{LOWER}$) are computed. According to the present embodiment, $\alpha_{UPPER}$ refers to the average alpha value of the texels which have a alpha value above $\alpha_{MEAN}$, and $\alpha_{LOWER}$ refers to the average alpha value of the texels which have a lower alpha value than $\alpha_{MEAN}$. Further, in the present embodiment, the values $\alpha_{MEAN}$, $\alpha_{UPPER}$, and $\alpha_{LOWER}$, define four different alpha levels (or ranges) including a highest alpha level corresponding to texels having alpha values higher than $\alpha_{UPPER}$, a high alpha level corresponding to texels having alpha values between $\alpha_{UPPER}$ and $\alpha_{MEAN}$, a low alpha level corresponding to texels having alpha values between $\alpha_{MEAN}$ and $\alpha_{LOWER}$, and a lowest alpha level corresponding to texels having alpha values lower than $\alpha_{LOWER}$.

With reference still to FIG. 4, at step 530, two alpha-encoded bitmasks are generated to represent the alpha level associated with each texel of the color cell. In the present embodiment, the alpha-encoded bitmasks include two 4×4 bitmasks (one MSB bitmask and one LSB bitmask). For example, according to the present embodiment, if a pixel has an alpha value larger than or equal to $\alpha_{MEAN}$, the corresponding entry at the MSB bitmask is set to "1." If the pixel has a luminance value smaller then $\alpha_{MEAN}$, the corresponding entry at the MSB bitmask is set to "0." Similarly, any entry of the LSB bitmask will be set to "1" if the luminance value of the corresponding pixel is higher than $\alpha_{LOWER}$ or $\alpha_{UPPER}$, and will be set to "0" if the luminance value of the corresponding pixel is lower than $\alpha_{LOWER}$ or $\alpha_{UPPER}$.

At step 540, representative alphas of the color cell are generated. In the present embodiment, one representative alpha, alpha a, is generated for the texels associated with the highest alpha level, and another representative alpha, alpha_b, is generated for the texels associated with the lowest alpha level. According to the present embodiment, alpha_a and alpha_b are generated by averaging the alpha values of all the texels within their respective alpha levels. Specifically, in the present embodiment, alpha_a is computed by averaging the alpha value of all the texels that have an alpha value above $\alpha_{UPPER}$, and alpha_b is computed by averaging the alpha values of all the texels that have an alpha value below $\alpha_{LOWER}$. In the present embodiment, alpha_a and alpha_b each comprises 8 bits.

At step 550, the two alpha values alpha_a and alpha_b generated at step 530 are appended to the alpha-encoded bitmasks. The resultant encoded (or compressed) color cell would therefore include two luminance-encoded bitmasks, two color values, two alpha-encoded bitmasks, and two alpha values. In the present embodiment, the encoded color cell includes 112 bits (32 bits of bitmasks for color compression, and two R08565 color values, 32 bits of alpha-encoded bitmasks for alpha compression, and two 8-bit alpha values).

It should be appreciated that the present embodiment may be modified support luminance textures and intensity textures. Luminance and intensity textures include monochrome values that are defined by the OpenGL Specification, which is available from the present assignee, and which is incorporated herein by reference.

Figure 5:
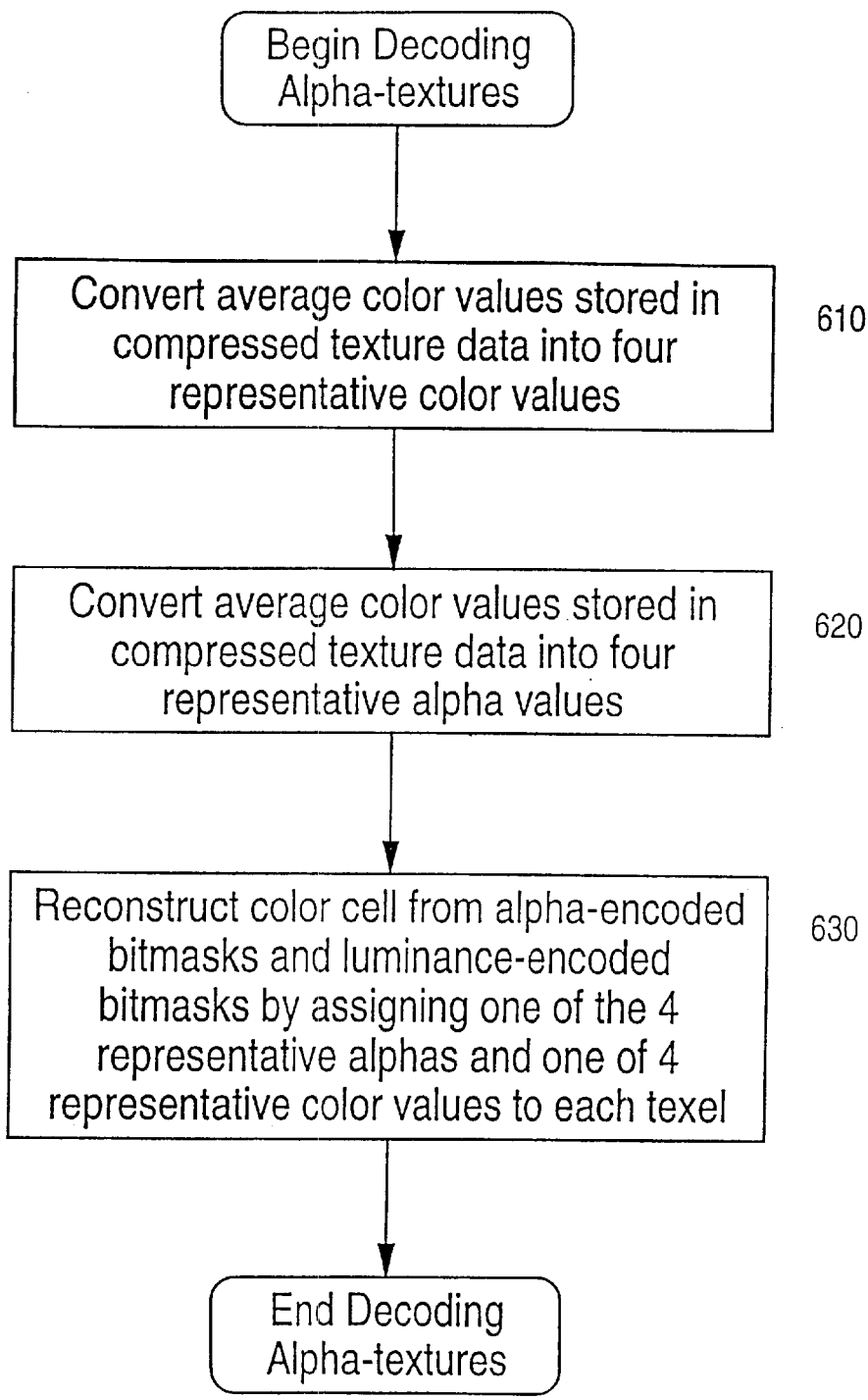
FIG. 5 is a flow diagram illustrating the process of restoring an alpha-texture color cell from compressed texture data according to one embodiment of the present invention.

Method of Restoring Compressed Texture Data According to One Embodiment of the Present Invention FIG. 5 is a flow diagram 600 illustrating a method of restoring texture data compressed by an encoding process such as the one illustrated in FIG. 4 in accordance with one embodiment of the present invention. Thus, in the following discussion, it is assumed that a color cell including 4×4 texels has been compressed using the method described above to generate a compressed color cell having two 44 luminance-encoded bitmasks, two RGB565 color values, two 44 alpha-encoded bitmasks, and two alpha values.

As illustrated in FIG. 5, at step 610, the first RGB565 color and the second RGB565 color of the compressed color cell are first converted to two RGB8 color values color_a and color_b. Thereafter, two additional RGB8 color values color_a1 and color_b1 are interpolated from the color values color_a and color_b.

At step 620, two alpha values alpha_a1 and alpha_b1 are interpolated from the alpha values alpha_a and alpha_b present in the compressed color cell. Particularly, in the present embodiment, alpha_a1 and alpha_b1 are interpolated from alpha values alpha_a and alpha_b according to the following formulas:

$$\text{alpha\_a1} = \frac{2}{3}x\,\text{alpha\_a} + \frac{1}{3}x\,\text{alpha\_b}$$

$$\text{alpha\_b1} = \frac{1}{3}x\,\text{alpha\_a} + \frac{2}{3}x\,\text{alpha\_b}$$

At step 630, the color cell is reconstructed from the luminance-encoded bitmasks, four RGB8 color values, the alpha-encoded bitmasks, and four alpha values. In the present embodiment, the bitmasks contain data identifying the luminance level and the alpha level of each of the texels of the color cell. Thus, in the present embodiment, the color cell is reconstructed by assigning each texel one of the representative colors (color_a, color_b, color_a1, and color_b1) and one of the representative alphas (alpha_a, alpha_b, alpha_a1, and alpha_b1) according to the texel's luminance level and alpha level.

It should be appreciated that, the present embodiment may be modified to support luminance textures and intensity textures. Luminance textures and intensity textures are defined in the OpenGL specification, which is hereby incorporated by reference.

Figure 6:
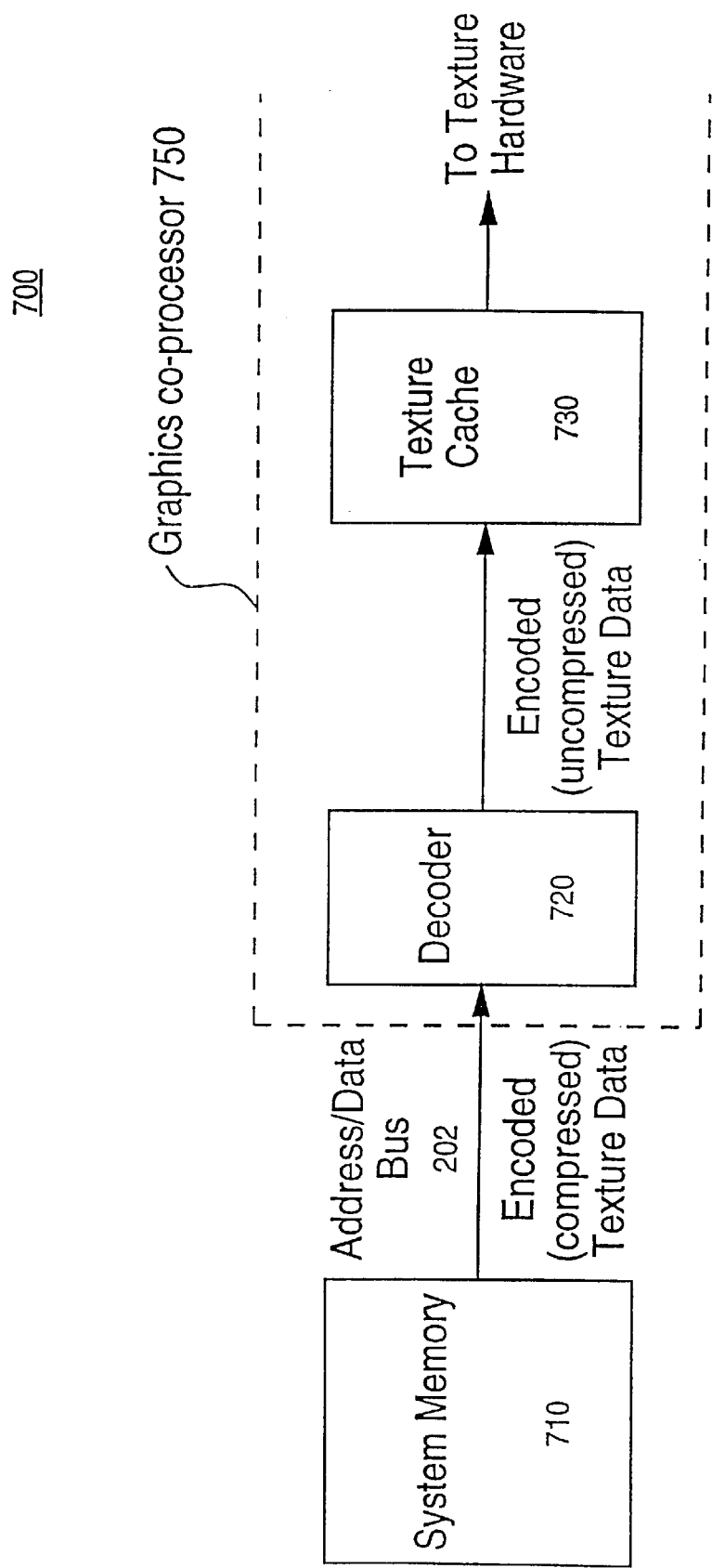
FIG. 6 is a logical block diagram of an apparatus for uncompressing texture data according to another embodiment of the present invention.

Apparatus for Uncompressing Texture Data According to One Embodiment of the Present Invention The present invention also provides for an apparatus that automatically and transparently uncompresses texture data contemporaneously with the texture-mapping process. FIG. 6 is a logical block diagram 700 illustrating portions of a graphics co-processor 750 that may be implemented in graphics subsystem 212 of computer system 201. As illustrated in FIG. 6, graphics coprocessor 750 includes a decoder 710 for uncompressing compressed texture data, and a texture cache 720 for storing uncompressed texture data. Other portions of the graphics co-processor 750 are not illustrated in order to avoid obscuring aspects of the present invention. Also illustrated is system memory 710 of computer system 201 which stores compressed texture data and may comprise volatile memory 206, non-volatile memory 208, and data storage unit 210 of computer system 201.

Specifically, in the present embodiment, decoder 720 is configured for receiving and converting luminance-encoded bitmasks and color values, which may be generated by the compression method as illustrated in FIG. 2, into uncompressed color cells. Further, decoder 720 is configured for performing the conversion on the fly as texture data are transferred from the system memory 710 to the texture cache 730 on the fly. Hardware implementation and operations of the decoder 720 should be apparent to those of ordinary skill in the art upon reading the present disclosure. Therefore, implementation details are not described herein in detail to avoid obscuring aspects of the present invention. It should also be apparent to those of ordinary skill in the art that the present invention may be modified to uncompress alpha-textures, luminance-textures, intensity-textures, etc., transparently and automatically.

Progressive Color Cell Compression

Figure 7:
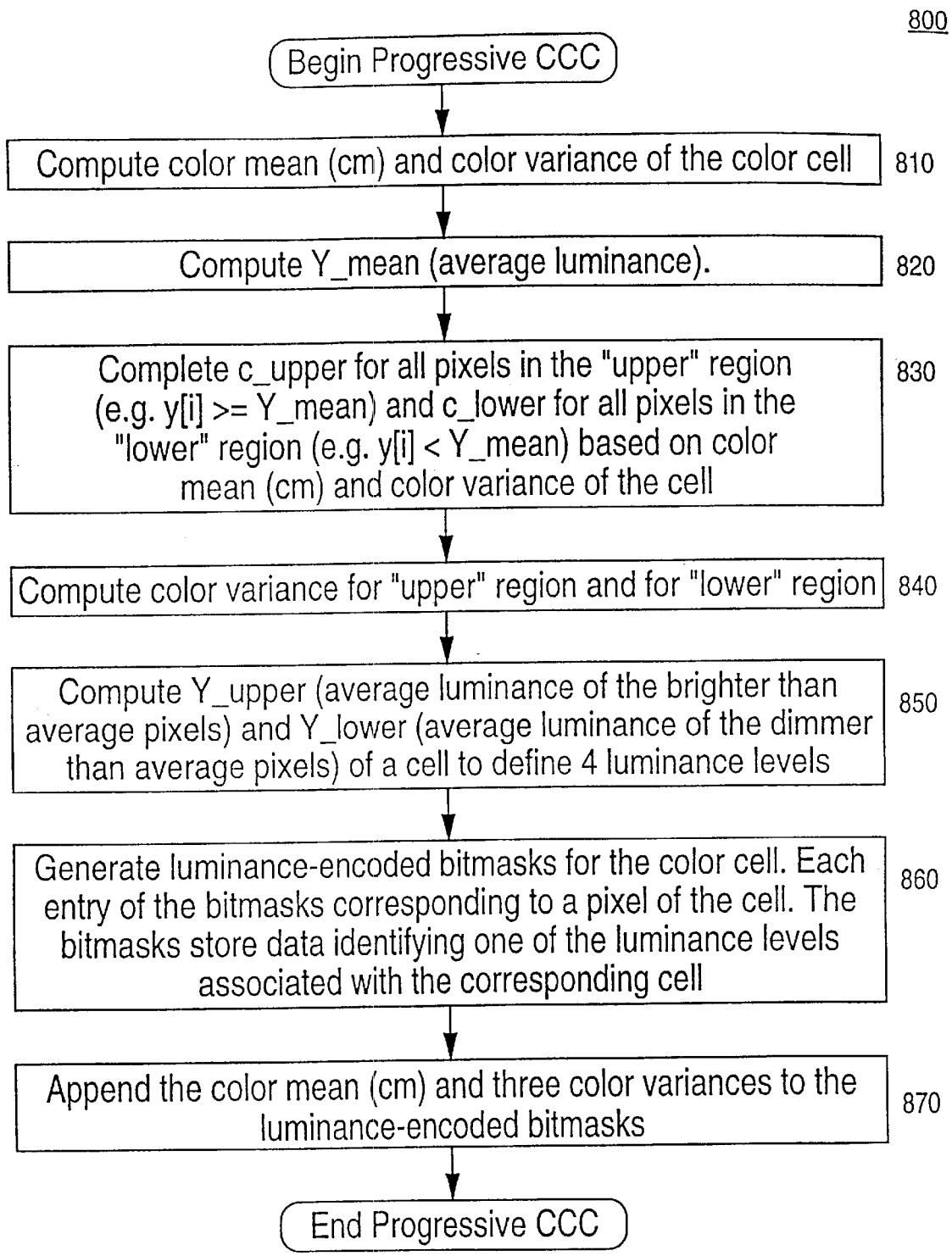
FIG. 7 the process of compressing a color cell according to yet another embodiment of the present invention.

FIG. 7 is a flow diagram 800 illustrating a progressive color cell compression method in furtherance of another embodiment of the present invention. The present embodiment provides an encoding scheme in which the amount of data to be transmitted is user-selectable depending upon the interconnection bandwidth. In this way, although the storage format is fixed to a lower compression ratio, transmission rate is preserved.

As illustrated in FIG. 7, at step 810, a color mean (cm) and a color variance of a color cell is computed. In the present embodiment, the color variance is approximated as a mean average error (MAE). Particularly, the following formula is used to approximate the MAE:

$$MAE = \text{sum }(abs(c[i]-cm))/N$$

where N is the number of pixels in the color cell. The color mean (cm) is computed by averaging the color values of all the pixels in the color cell.

At step 820, a luminance mean ($Y_{MEAN}$) is computed from the color mean. Particularly, in the presence embodiment, the luminance mean is computed from the color mean using well known methods and algorithms.

At step 830, the mean color value (c_upper) of all the pixels in the "upper" region (e.g., y[i]>=ym) and the mean color value for all the pixels in the "lower" region (e.g., y[i]<ym) are computed based on the color mean (cm) and the MAE. Particularly, according to the present embodiment, the mean color values are computed using the following formulas:

$$c\_upper = cm + MAE \times (N_L/N_U)$$

$$c\_lower = cm + MAE \times (N_U/N_L)$$

where $N_U$=number of pixels in the "upper" region, and where $N_L$ pixels in the "lower" region.

At step 840, color variances for the "upper" and "lower" regions are computed using c_upper and c_lower computed at step 830. Particularly, a mean average error for each of the "upper" and "lower" regions are computed using the following formulas:

$$MAE_{UPPER} = \text{sum }(abs[i]-c\_upper)$$

$$MAE_{LOWER} = \text{sum }(abs[i]-c\_lower)$$

At step 850, the mean luminance value $Y_{UPPER}$ for the "upper" region and the mean luminance value $Y_{LOWER}$ for the "lower" region are computed. In the present embodiment, the values $Y_{MEAN}$, $Y_{UPPER}$, and $Y_{LOWER}$, define four different luminance levels (or ranges) including a highest luminance level corresponding to pixels having luminance values higher than $Y_{UPPER}$, a high luminance level corresponding to pixels having luminance values between $Y_{UPPER}$ and $Y_{MEAN}$, a low luminance level corresponding to pixels having luminance values between $Y_{MEAN}$ and $Y_{LOWER}$, and a lowest luminance level corresponding to pixels having luminance values lower than $Y_{LOWER}$.

At step 860, luminance-encoded bitmasks are generated to represent the luminance level of each pixel of the color cell. In the present embodiment, the luminance-encoded bitmasks include two 44 bitmasks (one MSB bitmask and one LSB bitmask). For example, according to the present embodiment, if a pixel has a luminance value larger than or equal to $Y_{MEAN}$, the corresponding entry at the MSB bitmask is set to "1." If the pixel has a luminance value smaller then $Y_{MEAN}$, the corresponding entry at the MSB bitmask is set to "0." Similarly, if the pixel has a luminance value larger than or equal to $Y_{UPPER}$, the corresponding entries at the MSB bitmask and the LSB bitmask will be set to "1." If the pixel has a luminance value smaller than $Y_{LOWER}$, then the corresponding entries at the MSB bitmask and the LSB bitmask will be set to "0." Similarly, an entry of the LSB bitmask will be set to "1" if the luminance value of the corresponding pixel is higher than $Y_{LOWER}$ or $Y_{UPPER}$, and the entry will be set to "0" if the luminance value of the corresponding pixel is lower than $Y_{LOWER}$ or $Y_{UPPER}$.

At step 870, the color mean value (cm) and three color variance values (MAE, $MAE_{UPPER}$, and $MAE_{LOWER}$) are appended to the luminance-encoded bitmasks. In the present embodiment, the luminance-encoded bitmasks include thirty-two bits, the color mean includes sixteen bits, and each color variance includes sixteen bits. In this way, a compression ratio of 4 bits per pixel is achieved.

One advantage of the progressive color cell compression method as described above is that image quality can be traded off with transmission speed, and the trade-off is user selectable. For example, the user may choose to transmit only the color mean value (cm) to represent the whole color cell when the transmission bandwidth is low. In another instance, the user may choose to send only the color mean value (cm), the MAE, and the MSB bitmask. In that event, the decoding algorithm will re-compute the average color for the "upper" region and the average color for the "lower" region, and use the MSB bitmask to choose between them. The user may also choose to send all the data. In this case, the decoding algorithm will re-compute four color values based on the mean and three color MAEs. The bitmasks are then used to assign one of the four color values to each of the pixels for high bandwidth, high quality viewing.

Advanced Method For Selecting Representative Colors According to One Embodiment of the Present Invention According to one embodiment of the present invention, an even more accurate representation of the original color cell can be achieved by determining a vector that represents a best fit of all color values of the texels in the color cell in a multi-dimensional color space, and then choosing the four color values that lie on the vector as the representative colors of the cell. This method, although significantly more complicated than the interpolation method described above, produces compressed color cells that are superior in quality.

Figure 8:
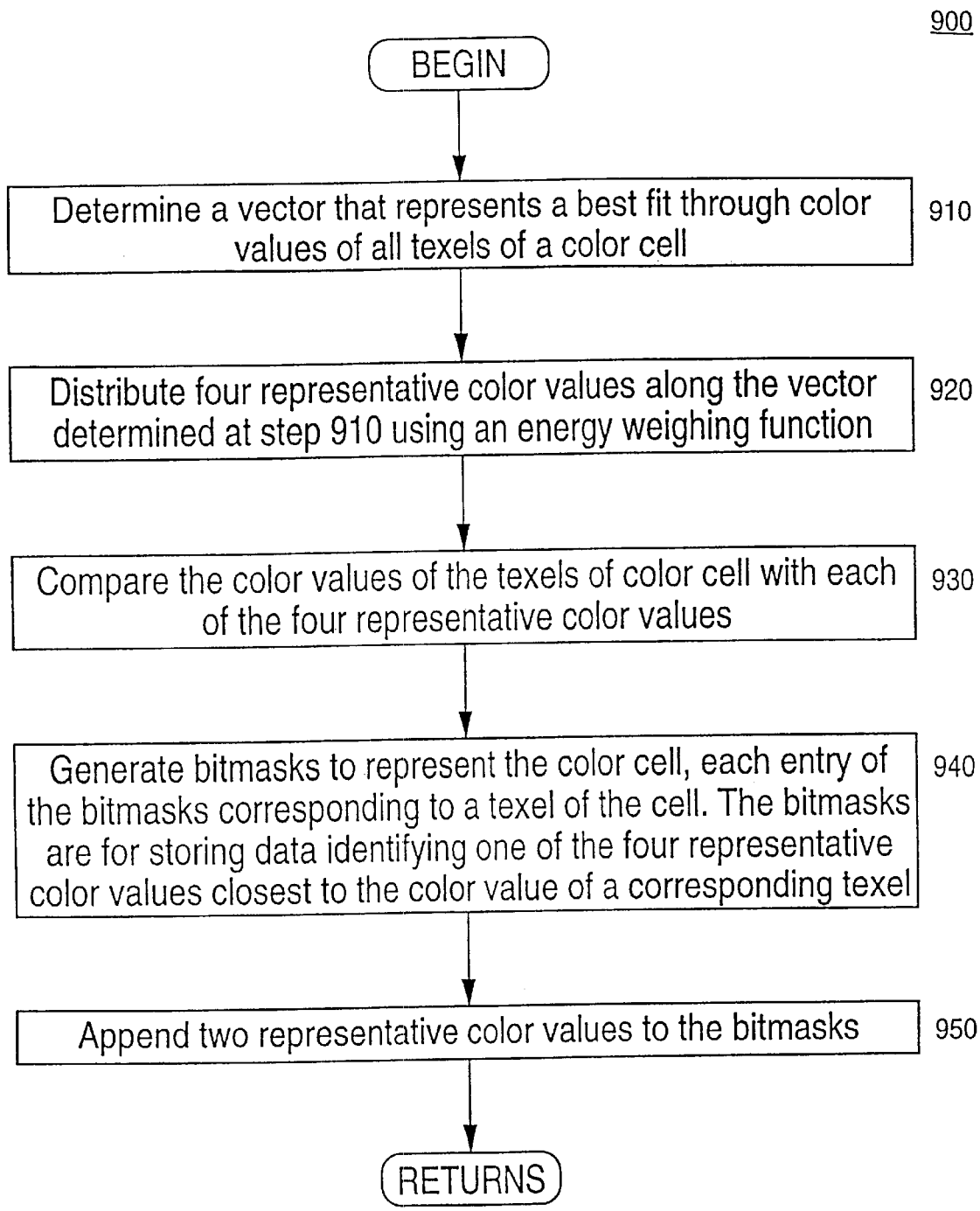
FIG. 8 is a flow diagram illustrating the process of compressing a color cell according to another embodiment of the present invention.

FIG. 8 is a flow diagram 900 illustrating the process of compressing a color cell according to another embodiment of the present invention. As illustrated, at step 910, a vector that represents a "best fit" through the color values of all the texels of the color cell is determined. In the present embodiment, the vector is found by the determination of eigenvalues of a covariance matrix.

At step 920, an energy weighing function is used to distribute four representative color values along the vector determined at step 910. According to the present embodiment, this step is performed as an iterative process that converges to a minimum energy solution.

At step 930, each of the sixteen texels of the color cell is compared to the four representative color values determined at step 920.

At step 940, two bitmasks are generated to store data identifying one of the representative color values that is closest to the corresponding texel. Each texel of the color cell is then assigned the mask value of the closest one of the representative colors.

At step 950, the four representative color values generated at step 920 are appended to the two bitmasks generated at step 940. The resultant encoded (or compressed) color cell would therefore include two bitmasks and two representative color values. The discarded representative color values are recovered using interpolation methods during uncompression.

An exemplary subroutine for finding the vector and the four representative color values that lie on the vector is given below in pseudo- code.

Exemplary Subroutine for Finding Representative Colors Using Co-variance Matrices and Energy Weighing Functions main
  ReadImg
    read in the texture to be compressed into memory
  Compressing
    store image as a set of 4×4 tiles
    for each tile call Quantize
  Quantize
    DoCollapse
      compute a mean for r, g, and b
      subtract means from each color component of each texel
      find the best axis on which to assign our compressed colors findaxes
      load a 3×3 matrix as follows:
        Er^2 Egr Ebr
        Erg Eg^2 Ebg
        Erb Egb Eb^2
      calculate the eigenvalues and normalize eigenvectors of the above matrix using a call to EigenValues
    EigenValues
      sort the eigenvectors into descending order EigenSort
    generate the rotation matrix to move the color samples to align with the best axis
  FindRot
    also generate the inverse rotation matrix
  FindRot
    rotate the color samples so that they lie on the newly determined axis. Use a 3×3 matrix multiplication to do the rotation.
  DoRotate
    zero out the g and b components since we will only be optimizing position along the principle (now aligned with r axis).
    find the min and max values of the 16 samples and assign them as the starting values of the search for the optimal compressed root values.
    call Remap recursively until it converges on the optimal two compressed root values.
  Remap
    generate the two intermediate root points $r1=0.67*r0+0.33*r3;$ $r2=0.33*r0+0.67*r3;$ calculate signed error from each of the root points for each of the sample points.
    choose the root point that gives the minimum error for each sample point and
    keep a running total of the error for each root point.
      calculate the mean error for each root point
        apply the mean error to modify the 2 root and 2 derived points
        calculate new root points based on the errors determined above as follows:

$$\text{new\_root\_0} = (r0*(r0*3+r1+r2+r3)+ \\ (r1-(r2-r1)*(r1+r2)+(r1-(r3-r1)0.5)*(r1+r3)+ \\ (r2-(r3-r2)*2)*(r2+r-3))/(3.*\text{TILEAREA})$$

Similarly for new_root_3.
    calculate the mean standard error for the new root points
    once the root colors have been optimized sort the 16 sample colors into the correct 1 of 4 bins.
  BestColor
    determine for each of the 16 samples which of the 4 root colors it is closest to.
    undo the rotation that made the color vector one dimensional by multiplying the root colors by the inverse matrix and adding the mean value per component back to the root colors.
    clamp the root colors components between 0 and 255
  DoRotate
  CompressPack
    build up a mask of two bits for each of the texel samples.
    convert the RGB8 root colors into a RGB565 representation.
  WriteCompImg
    write out the compressed texture It should be appreciated that the above method can be implemented using hardware and/or software. If implemented in software, the above method can be implemented using common programming languages such as C, C++ or Java. An exemplary implementation of the subroutine above is included in Appendix A.

Figure 9:
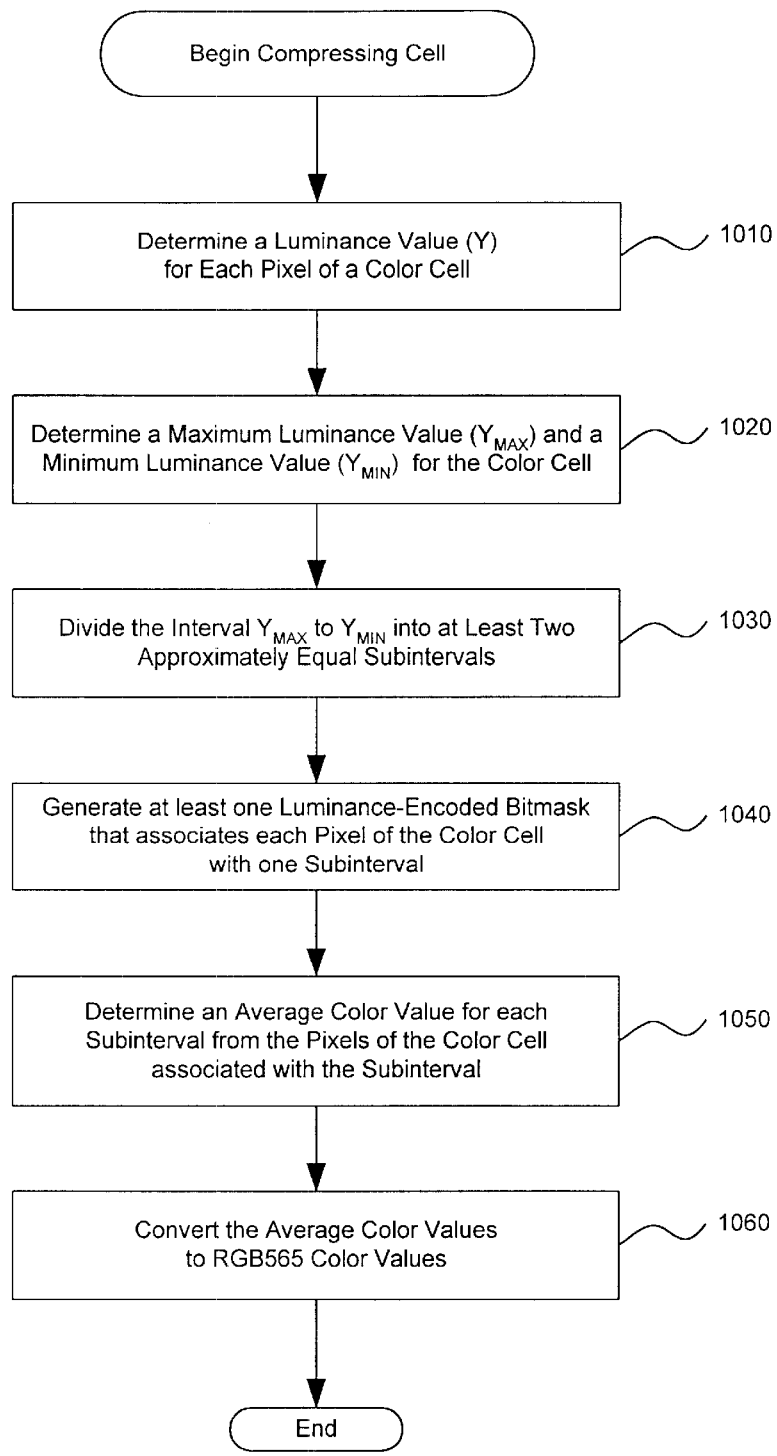
FIG. 9 is a flow diagram illustrating the process of compressing a color cell according to a second embodiment of the present invention.

Method of Compressing Image Data According to a Second Embodiment of the Present Invention FIG. 9 is a flow diagram illustrating a method 1000 of compressing a color cell according to a second embodiment of the present invention. In the following discussion, image data is divisible into a matrix of color cells, and each color cell includes 4×4 pixels. In the present embodiment, there are twenty-four bits of color values (RGB8 format) per pixel. It should be appreciated that the number of pixels per cell and the number of bits per pixel are illustrative examples, and that the present invention may be applied to compress color cells of different sizes and having different number of bits per pixel.

At step 1010, the luminance (Y) of each pixel of the cell is computed. In the present embodiment, the luminance value, Y, of a pixel is computed from its RGB values by summing the individual RGB values of that pixel. For example, the luminance value Y(i) of the i-th pixel of the color cell may be calculated by the formula:

$$Y(i)=0.250 \times R(i)+0.500 \times G(i)+0.250 \times B(i).$$

In step 1020, a maximum luminance value ($Y_{MAX}$) and a minimum luminance value ($Y_{MIN}$) are determined from the set of luminance values calculated in step 1010 for the cell. For example, any sorting routine can be used to identify the maximum and minimum luminance values.

In one example, a maximum luminance value (y_max) is set equal to a minimum 8-bit value (0), and a minimum luminance value (y_min) is set to a maximum 8-bit value (255). A maximum comparision function (max) that determines the maximum of two values is then used to compare y_max to each luminance value calculated for each pixel (i) in step 1010. The y_max value is set to the maximum of y_max and y[i] for each pixel evaluated (i=0 to 15). A minimum comparison function (min) that determines the minimum of two values is then used to compare y_min to each luminance value (y[i]) calculated for each pixel (i) in step 1010. The y_min value is then set to the minimum of y_min and y[i] for each pixel evaluated (i=0 to 15). An exemplary subroutine for calculating $Y_{MAX}$ and $Y_{MIN}$ is given below in pseudo-code.

Exemplary Subroutine for Calculating $Y_{MAX}$ and $Y_{MIN}$: compute-luminance( ){

| | |
|---|---|
| y_max = 0 | |
| y_min = 255 | |
| y_max = max(y_max, y[i]) | for i = 0 to 15; |
| y_min = min(y_min, y[i]) | for i = 0 to 15; |

}

In step 1030, the interval $Y_{MAX}$ to $Y_{MIN}$ is divided into at least two approximately equal subintervals. In an embodiment of the present invention, the interval $Y_{MAX}$ to $Y_{MIN}$ or [$Y_{MAX}$, $Y_{MIN}$] is divided into two approximately equal subintervals. These two intervals are [$Y_{MAX}$, $0.5(Y_{MAX}+Y_{MIN})$] and [$0.5(Y_{MAX}+Y_{MIN})$, $Y_{MIN}$]. In another embodiment, the interval $Y_{MAX}$ to $Y_{MIN}$ is divided into four approximately equal subintervals. These four intervals are [$Y_{MAX}$, $0.25(3Y_{MAX}+Y_{MIN})$], [$0.25(3Y_{MAX}+Y_{MIN})$, $0.5(Y_{MAX}+Y_{MIN})$], [$0.5(Y_{MAX}+Y_{MIN})$, $0.25(Y_{MAX}+3Y_{MIN})$], and [$0.25(Y_{MAX}+3Y_{MIN})$, $Y_{MIN}$]. Dividing the interval [$Y_{MAX}$, $Y_{MIN}$] into approximately equal subintervals eliminates the need to calculate $Y_{MEAN}$, $Y_{UPPER}$, and $Y_{LOWER}$ as is required with method 300.

In step 1040, luminance-encoded bitmasks are generated that associate each pixel of the color cell with one of the subintervals created in step 1030. In the case where the interval $Y_{MAX}$ to $Y_{MIN}$ is divided into two subintervals, only one 4×4 bitmask is needed to associate each pixel of the color cell with a subinterval. In an embodiment of the present invention, the bitmask generated in step 1040 is a single 16-bit word. Each bit of the word is either a "0" or a "1." The bits of the bitmask are determined by comparing each luminance value y[i] for each pixel (i) calculated in step 1010 to the value $0.5(Y_{MAX}+Y_{MIN})$. If y[i] is greater than or equal to $0.5(Y_{MAX}+Y_{MIN})$, the bit of the bitmask is set to "1." If y[i] is not greater than or equal to $0.5(Y_{MAX}+Y_{MIN})$, the bit of the bitmask is set to "0." The following exemplary subroutine, given below in pseudo-code, can be used to generate a luminance-encoded bitmask that associates the pixels of the color cell with a subinterval.

Exemplary Subroutine for Generating a Luminance-Encoded Bitmask that Associates the Pixels of a Color Cell to One of Two Subintervals: produce_luminance_encoded_bitmask( ){

| | |
|---|---|
| if(y[i] >= $0.5(Y_{MAX} + Y_{MIN})$) | mask[i] = 0 for i = 0 to 15; |
| | /*high luminance level*/ |
| else | mask[i] = 0 for i = 0 to 15; |
| | /*low luminance level*/ |

}

In the case where the interval $Y_{MAX}$ to $Y_{MIN}$ is divided into four subintervals, the following exemplary subroutine, given below in pseudo-code, can be used to generate luminance-encoded bitmasks that associate the pixels of the color cell to one of four subintervals. In this case, however, two 4×4 bitmasks are needed to associate the pixels of the color cell to a subinterval, one MSB bitmask and one LSB bitmask. Similar to method 300, if a pixel has a luminance value larger than or equal to $0.5(Y_{MAX}+Y_{MIN})$, the corresponding entry at the MSB bitmask is set to "1." If the pixel has a luminance value smaller then $0.5(Y_{MAX}+Y_{MIN})$, the corresponding entry at the MSB bitmask is set to "0." If the pixel has a luminance value greater than or equal to $0.25(3Y_{MAX}+Y_{MIN})$, the corresponding entries at both the MSB bitmask and the LSB bitmask will be set to "1." If the pixel has a luminance value smaller than $0.25(Y_{MAX}+3Y_{MIN})$, then the corresponding entries at both the MSB bitmask and the LSB bitmask will be set to "0." The LSB bitmask will be set to "1" if the luminance value of the corresponding pixel is greater than or equal to $0.25(3Y_{MAX}+Y_{MIN})$ or $0.25(Y_{MAX}+3Y_{MIN})$, as appropriate. It will be set to "0" if the luminance value of the corresponding pixel is lower than $0.25(3Y_{MAX}+Y_{MIN})$ or $0.25(Y_{MAX}+3Y_{MIN})$, as appropriate.

Exemplary Subroutine for Generating Two Luminance-Encoded Bitmasks that Associate the Pixels of a Color Cell to One of Four Subintervals. produce_luminance_encoded_bitmasks( ){

| | |
|---|---|
| if (y[i] >= $0.25(3Y_{MAX} + Y_{MIN})$) | mask[i] = 11 for i = 0 to 15; |
| | /*highest luminance level*/ |
| if (y[i] >= $0.5(Y_{MAX} + Y_{MIN})$) | mask[i] = 10 for i = 0 to 15; |
| | /*high luminance level*/ |
| if (y[i] >= $0.25(Y_{MAX} + 3Y_{MIN})$) | mask[i] = 01 for i = 0 to 15; |
| | /*low luminance level*/ |
| else | mask[i] = 00 for i = 0 to 15; |
| | /*lowest luminance level*/ |

}

A person skilled in the relevant art(s) would know how to associate each pixel of a color cell to a subinterval and generate bitmasks, given the description herein, if the interval $Y_{MAX}$ to $Y_{MIN}$ is divided into a number of intervals other than two or four.

In step 1050, an average color value for each subinterval is determined using the pixels that are associated with the subinterval. In the case where the interval $Y_{MAX}$ to $Y_{MIN}$ is divided into two subintervals, two color values are generated. One representative color, color__1, is generated for the pixels associated with the high luminance level, and another representative color, color__0, is generated for the pixels associated with the low luminance level. According to the present embodiment, representative colors color__1 and color__0 are generated by averaging all the color values of the pixels associated with the particular subinterval. Specifically, in the present embodiment, color__1 is determined by computing the average color value of all the pixels of the color cell that have a luminance value greater than or equal to $0.5(Y_{MAX}+Y_{MIN})$. Color__0 is determined by computing the average color value of all the pixels of the color cell that have a luminance value less than $0.5(Y_{MAX}+Y_{MIN})$. The present invention is not limited to averaging, however. The representative colors can be selected based on a mean value, predetermined value, user-specified value, or other function.

In the present embodiment, color__1 and color__0 each comprise 24 bits in RGB8 format. However, in order to attain an even higher compression ratio, in step 1060 of the present embodiment, color__1 and color__0 are converted from RGB8 to RGB565 color values. The conversion can be accomplished by truncating the three least significant bits (LSBs) of the red and blue color values and the two LSBs of the red color value.

In the case where the interval $Y_{MAX}$ to $Y_{MIN}$ is divided into four subintervals, four average color values are determined in a manner similar to that described above. A color__11 is determined for the pixels associated with the highest luminance level, i.e, those pixels having a luminance value greater than or equal to $0.25(3Y_{MAX}+Y_{MIN})$ Similarly, a color__10 is determined for the pixels associated with the high luminance level, a color__01 is generated for the pixels associated with the low luminance level, and a color__00 is generated for the pixels associated with the lowest luminance level. A person skilled in the relevant art(s) would know how to generate these average color values given the description herein.

As a last step (not show), the average color values may be appended to the generated bitmasks for transmission over a network or for storage.

It should be appreciated that the above method can be implemented using hardware, firmware, and/or software. If implemented in software, the above method can be implemented using common programming languages.

Figure 10:
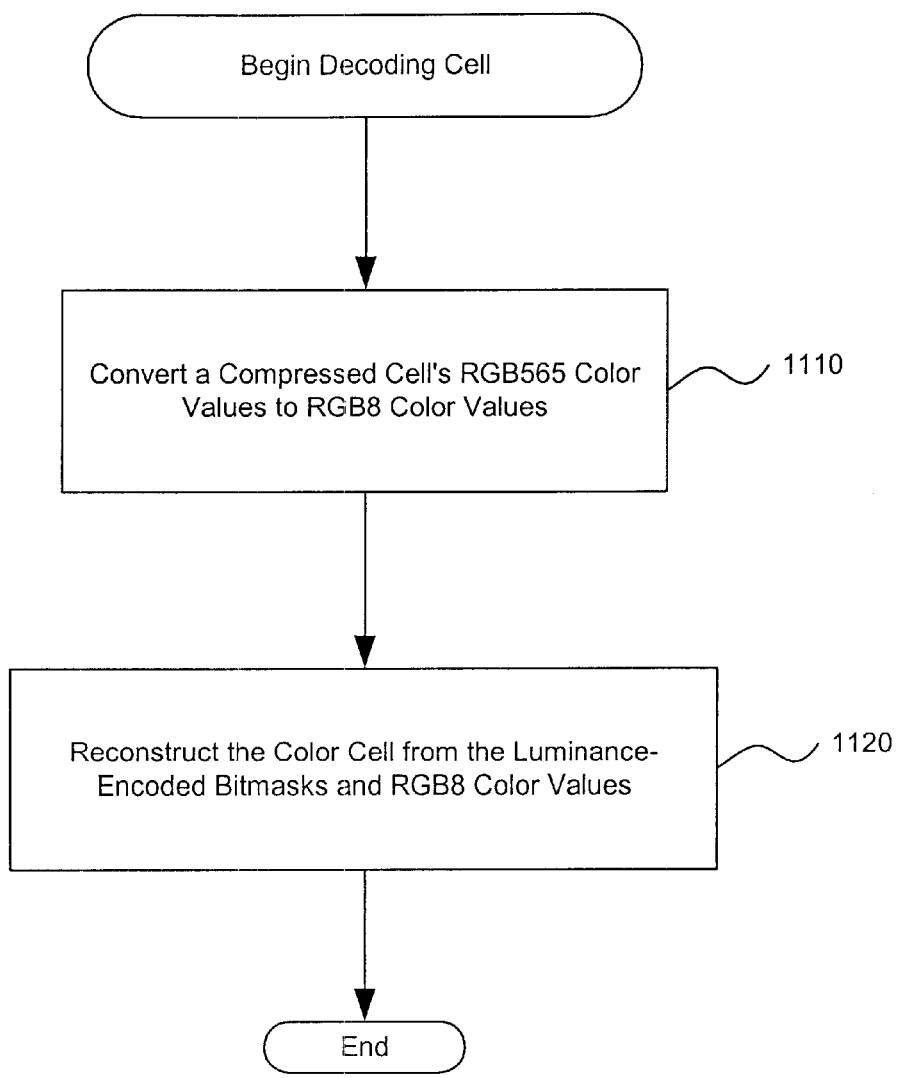
FIG. 10 is a flow diagram illustrating the process of restoring a color cell from data compressed by the encoding process illustrated in FIG. 9 in accordance with an embodiment of the present invention.

Method of Decoding Image Data According to a Second Embodiment of the Present Invention FIG. 10 is a flow diagram of a method 1100, which illustrate one process for restoring a color cell from data compressed by the encoding process illustrated in FIG. 9. In the following discussion, it is assumed that a color cell including 4×4 pixels has been compressed using the method described above for dividing an interval into four approximately equal subintervals, i.e., a case where two 4×4 luminance-encoded bitmasks and four RGB565 color values were generated. However, it should be noted that the present method of restoring (or uncompressing) a color cell works equally well where more or less than two 4×4 luminance-encoded bitmasks and four RGB565 color values were generated. The method illustrated in flow diagram 1100 is entirely independent of the encoding process.

Figure 11:
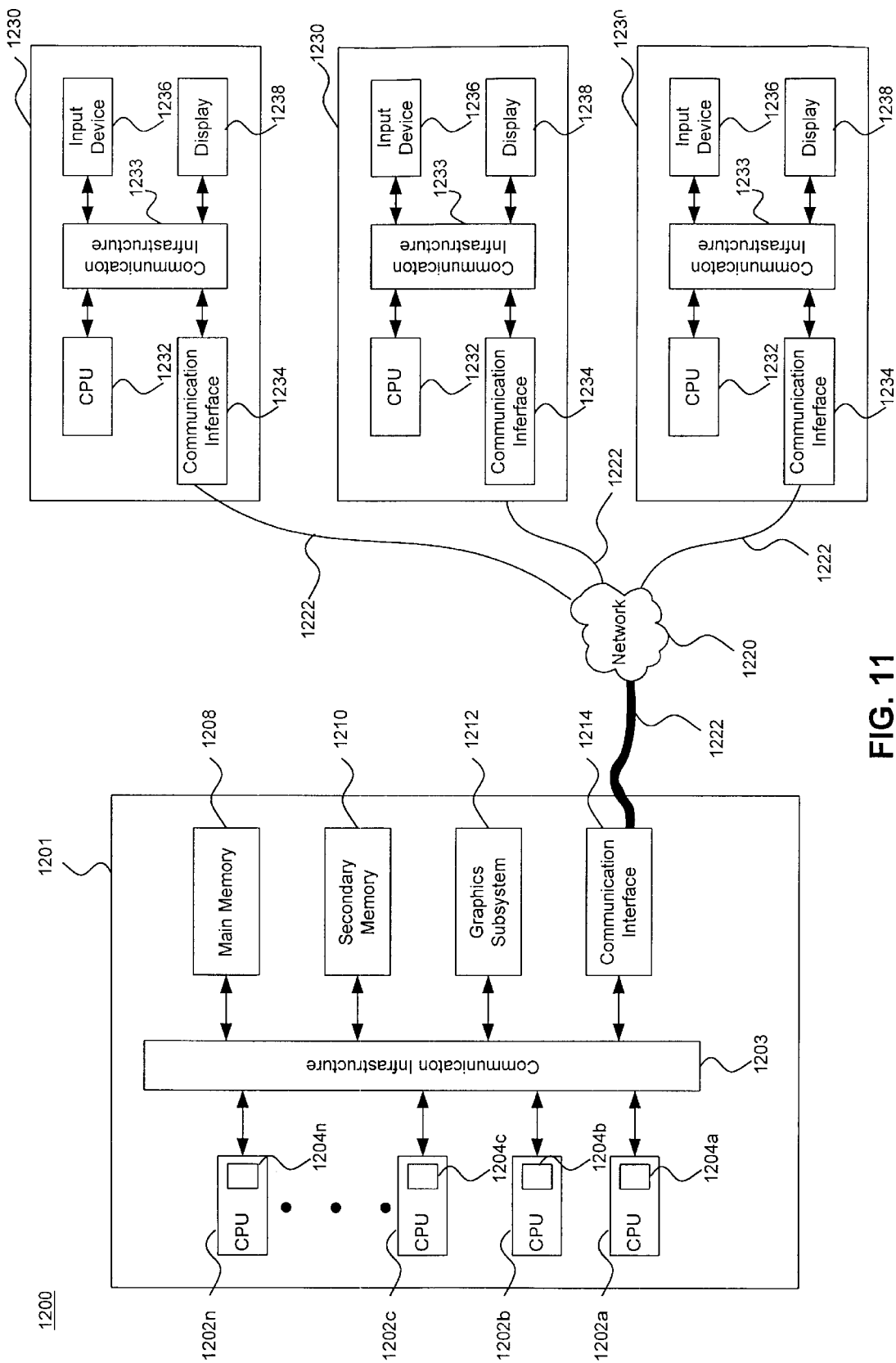
FIG. 11 is a block diagram illustrating an second exemplary computer system used as part of a computer graphics system in accordance with an embodiment of the present invention.

As illustrated in FIG. 11, at step 1110, each of the four RGB565 color values of the compressed color cell are converted to an RGB8 color value, i.e., color__11, color__10, color__01, and color__00. This step can be carried out by appending O's to the MSB's of each red, green, and blue color value. In a preferred embodiment, the bits "100" are appended to the red and blue bits and the bits "10" are appended to the green bits, rather than all zeros, in order to minimize any shift in intensity.

At step 1120, the color cell is reconstructed from the luminance-encoded bitmasks and the four color values. In the present embodiment, the bitmasks contain data identifying the luminance level of each of the pixels of the color cell. Thus, in the present embodiment, the color cell is reconstructed by assigning each pixel one of the representative colors, color__11, color__10, color__01, and color__00, according to the pixel's luminance level. According to the present invention, the reconstructed color cell closely resembles the uncompressed color cell despite the high data compression ratio.

It should be appreciated that the above method can be implemented using hardware and/or software. If implemented in software, the above method can be implemented using common programming languages.

Network System Environment of the Present Invention

FIG. 11 is a block diagram illustrating an exemplary network system 1200. Network system 1200 is used as part of a computer graphics system in accordance with an embodiment of the present invention. Network graphics machine 1201 has multiple central processor units (CPU) 1202 and a graphics subsystem 1212 that enable it to render images at a much faster rate than computers 1230 can render images. In one example, the methods of the present invention, for example methods 1000 and 1100, permit users of computers 1230 to view in real-time images being processed on network graphics machine 1201. Real-time means about 30 frames per second or faster for a 640×512 pixel image. Portions of the present invention are comprised of computer-readable and computer executable instructions which reside in computer-usable media of network graphics machine 1201 and computers 1230.

In general, computers 1230 have only a limited ability to render images. Because computers 1230 cannot render images at a rate comparable to network graphics machine 1201, users of computers 1230 would typically prefer to run image intensive application programs on network graphics machine 1201. The present invention enables user of computers 1230 to view images rendered on network graphics machine 1201 on displays 1238.

Network graphics machine 1201 has multiple central processor units (CPU) 1202. CPUs 1202 are electrically connected to a communication infrastructure 1203. Also connected to communications infrastructure 1203 are a main memory unit 1208, a secondary memory unit 1210, a graphics subsystem 1212, and a communications interface unit 1214. Each CPU 1202 may have a cache memory unit 1204. Network graphic machine 1201 is typically optimized for running image intensive application programs.

Computers 1230 are depicted as having only a single CPU 1202. Computers 1230 may have more than one CPU, however. CPU 1202 is electrically connected to a communication infrastructure 1233. Also connected to communications infrastructure 1233 are a communications interface unit 1234, an input device 1236, and a display 1238. The user inputs commands to computer 1230 using input device 1236. The commands are then either processed by CPU 1232 or transferred to another CPU for processing via communications interface 1234, communications link 1222, and network 1220. For example, if a user inputs a command that requires an image to be rendered, the command can be transferred to network graphics machine 1201.

Network graphics machine 1201 can render images using CPUs 1202 and graphics subsystem 1212, and transfer the images to computers 1230 in real-time for viewing on displays 1238. After an image requested by a user of computer 1230 is rendered on network graphics machine 1201, it is compressed using method 1000. The color cells of the image can be compressed in parallel using CPUs 1202 and the computer-readable and computer executable instructions of the present invention.

After being compressed, the compressed color cells of the image are transferred to computer 1230 via communications interface 1214, communications links 1216, and network 1220. Communications links 1222 can be any type of communication link, for example, wire, fiber optics cable, or radio frequency electromagnetic energy waves. Network 1220 can be any network, such as a local area network or a wide area network. Network 1220 typically comprises servers, routers, switches and other known means for sending data between computers.

The compressed color cells transmitted by network graphics machine 1201 are received by a computer 1230 using communication interface module 1234. After being received, compressed color cells are decoded using CPU 1232 and a method of the present invention, for example, method 1100. After decoding, the color cells of the image are display to the user on display 1238.

Conclusion

The present invention, a method and apparatus for compressing and uncompressing image data has thus been disclosed. Using the present invention, texture images may be moved around efficiently even when the bandwidth between the texture storage and the graphics rendering engine is limited. In this way, the efficiency of texture mapping is significantly increased. An even higher performance gain is attained in computer systems or electronic game systems where texture memory is limited. Using the present invention, images can be rendered on a network graphics machine and transmitted over a network for display on a network system computer display. It should be appreciated that the present invention has been described with specific relevance to color cells having 4×4 pixels. However, such specific reference should not be construed to limit the scope of the present invention. Rather, the scope of the present invention should be construed according to the below claims.

APPENDIX A

```
/* The following code compresses a texture into the SGI
 * compressed texture format. Some low level routines
 * are reduced to shells to simplify the presentation. */
#include <stdio.h>      #include <image.h>
#include <math.h>       #include "compressed.h"
#define MAX(A,B)    ((A) > (B) ? (A) : (B))
#define MIN(A,B)    ((A) < (B) ? (A) : (B))
void Quantize(Color *pix, Comp cpix, int components);
void FindRot(float v[3],float m[3][3],float scale);
void DoCollapse(Colorf *c,int n, float m[3][3], float
im[3][3], Colorf *mean);
void DoRotate(int n, Colorf *cf, float m[3][3]);
float Remap(float *y, float *1);
```

APPENDIX A-continued

```
void BestColor(float *y, float *1, float im[3][3],
Colorf *mean,Comp cpix, float *a, float *alpha, int
components);
void CompressPack(Color c0, Color c1, int *m, int *ma,
Comp cpix, int components);
void
Usage(void)   {
    fprintf(stderr, "Usage: tocompressed src.rgb
dst.compressed [-1 -2 -3 -4]\n");
    exit(1);
}
/* Read a texture image into memory */
Color *
ReadImg(char *name, int *width_ptr, int *height_ptr, int
*comps_ptr) {
}
Comp
CompressImg(Color *pix, int w, int h, int components) {
    Color tile (TILEAREA];
    Comp cpix, cpixptr;
    int x, y, i, j;
    cpix.cpix4 = (Comp4 *) malloc(TILEBYTES(components)
* w * h / TILEAREA);
    cpixptr = cpix;
/* Store image as a set of 4×4 tiles. */
    for (y = 0; y < h; y += 4) {
        for (x = 0; x < w; x += 4) {
            for (j = 0; j < 4; j++) {
                for (i = 0; i < 4; i++) {
                    tile[j*4 + i] = pix[(y+j)*w + (x+i)];
                }
            }
            /* For each tile */
            Quantize(tile, cpixptr, components);
            if (HASALPHA(components)) {
                cpixptr.cpix8++;
            } else {
                cpixptr.cpix4++;
            }
        }
    }
    return(cpix);
}
/* Write the compressed texture image out. */
void
WriteCompImg(Comp cpix, char *name, int w, int h, int
components) {
}
main(int argc, char *argv[ ]) {
    char *srcfile, *dstfile;
    Color *Pix;
    Comp cpix;
    int w, h, components, imgcomps;
    if (argc < 3 || argc > 4) {
        Usage( );
    }
    srcfile = argv[1];
    dstfile = argv[2];
    if (argc == 4) {
        if (argv[3][0] != '—' || argv[3][2] !='\0') {
            Usage( );
        }
        if (argv[3][1] < '1' || argv[3][1] > '4') {
            Usage ( );
        }
        components = argv[3][1] - '0';
    }
    pix = ReadImg(srcfile, &w, &h, &imgcomps);
    if (components == 0) {
        components = imgcomps;
    }
    cpix = CompressImg(pix, w, h, components);
    WriteCompImg(cpix, dstfile, w, h, components);
}
/*************** Compressor ********************/
void
Quantize(Color *pix, Comp cpix, int components) {
    float y[TILEAREA], lum, min1, max1;
    int i;
```

APPENDIX A-continued

```
    float err, nerr;
    float 1[4], alpha[4], a[TILEAREA], mina, maxa;
    float m[3][3], im[3][3];
    Colorf mean;
    Colorf pf[TILEAREA];
/* choose the two endpoint colors */
    for (i=0; i<TILEAREA; i++) {
        pf[i].r = pix[i].r;
        pf[i].g = pix[i].g;
        pf[i].b = pix[i].b;
    }
    DoCollapse(pf, TILEAREA, m, im, &mean);
/* Find the min and max values of the 16 samples and
 * assign them as the starting values of the search for
 * the optimal compressed root values.*/
    min1 = max1 = pf[0].r;
        for (i=0; i<TILEAREA; i++) {
        y[i] = pf[i].r;
        if (y[i] > max1) {
            max1 = y[i];
        } else if (y[i] < min1) {
            min1 = y[i];
        }
    }
    1[0] = min1; 1[3] = max1;
/* call Remap recursively until it converges on the
 * optimal two compressed root values*/
    err = nerr = Remap(y,1);
    do {
        err = nerr < err ? nerr : err;
        nerr = Remap(y,1);
    } while (nerr < err);
/* choose the two endpoint alphas */
    if (HASALPHA(components)) {
        mina = maxa = pix[0].a;
        for (i=0; i<TILEAREA; i++) {
            a[i] = pix[i].a;
            if (a[i] > maxa) {
                maxa = a[i];
            } else if (a[i] < mina) {
                mina = a[i];
            }
        }
        alpha[0] = mina; alpha[3] = maxa;
        err = nerr = Remap(a,alpha);
        do {
            err = nerr < err ? nerr : err;
            nerr = Remap(a,alpha);
        } while (nerr < err);
    }
/* choose the best index for each pixel in the tile */
BestColor(y, 1, im, &mean, cpix, a, alpha, components);
}
float
Remap(float *y, float *1){
    int n[4]; float d[4]; float n1[4];
    float md, md2, td, td2, mse;
    int i, j, k; int mn;
/* Generate the two intermediate root points */
    1[1] = .67 * 1[0] + .33 * 1[3];
    1[2] = .33 * 1[0] + .67 * 1[3];
    for (i=0; i<4; i++) {n[i] = 0; d[i] = 0;
    }
/*Calculate signed error from each of the root points
 *for each of the sample points. Choose the root point
 *that gives the minimum error for each sample point and
 *keep a running total of the error for each root
 *point.*/
    for (i=0; i<TILEAREA; i++) {
        md = y[i] - 1[0]; md2 = md * md; mn = 0;
        for (j=1; j<4; j++) {
            td = y[i] - 1[j]; td2 = td*td;
            if (td2 < md2) {
                md = td; md2 = td2; mn = j;
            }
        }
        d[mn] += md; n[mn] ++;
    }
/* Calculate the mean error for each root point*/
    for (i=0; i<4; i++) {
        d[i] /= MAX{n[i],1);
    }
/* Apply the mean error to modify the 2 root and 2
 * derived points.*/
    n1[0] = 1[0] + d[0]; n1[1] = 1[1] + d[1];
    n1[2] = 1[2] + d[2]; n1[3] = 1[3] + d[3];
/* Calculate new root points based on the errors
 * determined above as follows.*/
    1[0] = n1[0]*(n[0]*3 + n[1] + n[2] + n[3]);
    1[0] += (n1[1]-(n1[2]-n1[1]))*(n[1]+n[2]);
    1[0] += (n1[1]-(n1[3]-n1[1])*0.5) * (n[1] + n[3]);
    1[0] += (n1[2]-(n1[3]-n1[2])*2) * (n[2] + n[3]);
    1[0] = 1[0] / (3.*TILEAREA);
    1[3] = n1[3] * (n[3] * 3 + n[0] + n[1] + n[2]);
    1[3] += (n1[1]+(n1[1] - n1[0])*2) * (n[0] + n[1]);
    1[3] += (n1[2]+(n1[2]-n1[0])*0.5) * (n[0] + n[2]);
    1[3] += (n1[2] + (n1[2] - n1[1])) * (n[1] + n[2]);
    1[3] = 1[3] / (3.*TILEAREA);
    1[1] = .67 * 1[0] + .33 * 1[3];
    1[2] = .33 * 1[0] + .67 * 1[3];
/*Calculate the mean standard error for the new root
 *points.*/
    mse = 0;
    for (i=0; i<TILEAREA; i++) {
        md = y[i] - 1[0]; md2 = md * md; mn = 0;
        for (j=1; j<4; j++) {
            td = y[i] - 1[j]; td2 = td*td;
            if (td2 < md2) {
                md = td; md2 = td2; mn = j;
            }
        }
        mse += md2;
    }
    return mse;
}
/* Sort each of the 16 samples into the appropriate root
 * color bin. */
void
BestColor(float *y, float *1, float im[3][3], Colorf
*mean,Comp cpix, float *a, float *alpha, int components)
{
    Color c[4]; Colorf cf[4]; Color e[2][2],b[2][2];
    int i, j; int m[TILEAREA],ma[TILEAREA],n1[4];
    float md, d; int mn; float aerr, berr; float aa[4];
/*Determine for each of the 16 samples which of the 4
 *root colors it is closest to.*/
    n1[0] = n1[1] = n1[2] = n1[3] = 0;
    aa[0] = aa[1] = aa[2] = aa[3] = 0;
    for (i=0; i<TILEAREA; i++) {
        md = y[i] - 1[0]; md = md * md; mn = 0;
        for (j=1; j < 4; j++) {
            d = y[i] - 1[j]; d = d * d;
            if (d < md) {
                md = d; mn = j;
            }
        }
        m[i] = mn; n1[mn]++; aa[mn] += a[i];
    }
    if (HASALPHA(components) && (alpha[0] != alpha[3])) {
        if ((aa[0] + aa[1])/(n1[0] + n1[1]) > (aa[2]+
aa[3])/(n1[2] + n1[3])){
            float tmp;
            tmp =alpha[0]; alpha[0] = alpha[3]; alpha[3] = tmp;
            tmp =alpha[1]; alpha[1] = alpha[2]; alpha[2] = tmp;
        }
        for (i=0; i<TILEAREA; i++) {
            md = a[i] - alpha[0];
            md = md * md;
            mn = 0;
            for (j=1; j < 4; j++) {
                d = a[i] - alpha[j];
                d = d * d;
                if (d < md) {
                    md = d;
                    mn = j;
                }
            }
            ma[i] = mn;
        }
```

APPENDIX A-continued

```
        }
        for (i=0; i< 4; i++) {
            cf[i].r = 1[i];
            cf[i].g = 0;
            cf[i].b = 0;
        }
/* Undo the rotation that made the color vector one
 * dimensional by multiplying the root colors by the
 * inverse matrix and adding the mean value per
 * component back to the root colors. */
        DoRotate (4,cf,im);
        for (i=0; i< 4; i++) {
            c[i].r = cf[i].r + mean->r;
            c[i].g = cf[i].g + mean->g;
            c[i].b = cf[i].b + mean->b;
            c[i].a = alpha[i];
/* Clamp the root colors components between 0 and 255.*/
            c[i].r = c[i].r<0?0: (c[i].r>255?255: c[i].r);
            c[i].g = c[i].g<0?0: (c[i].g>255?255: c[i].g);
            c[i].b = c[i].b<0?0: (c[i].b>255?255: c[i].b);
            c[i].a = c[i].a<0?0: (c[i].a>255?255: c[i].a);
        }
        CompressPack(c[0], c[3], m, ma, cpix, components);
}
/* Generate the 64 bit compressed packet for a 4x4 texel
 * tile. */
void
CompressPack(Color c0, Color c1, int *m, int *ma, Comp
cpix, int components)
{
    unsigned short pc0, pc1; unsigned char pa0, pa1;
    int n0, i; unsigned int mask;
/* Convert the RGB8 root colours into a R5G6B5
 * representation. */
    if (HASRGB(components)) {
/* convert to RGB_565 */
        pc0 = ((c0.r & 0xf8) << 8) | ((c0.g & 0xfc) <<
3) | ((c0.b & 0xf8) >> 3);
        pc1 = ((c1.r & 0xf8) << 8) | ((c1.g & 0xfc) <<
3) | ((c1.b & 0xf8) >> 3);
    } else {
/* convert to L_S15 */
        pc0 = ((c0.r & 0xff) << 7) | ((c0.r & 0xff) >> 1);
        pc1 = ((c1.r & 0xff) << 7) | ((c1.r & 0xff) >> 1);
    }
/* Build up a mask of two bits for each of the texel
 * samples. */
    mask = 0;
    n0 = 0;
    for (i=0; i<TILEAREA; i++)   {
        mask |= (m[i] << i*2);
        n0 += (m[i] < 2 ? 1 : 0);
    }
    if (n0 < 8)   {
        unsigned short tmpc;
        mask = ~mask;
        tmpc = pc0; pc0 = pc1; pc1 = tmpc;
    }
    cpix.cpix4->mask = mask;
    cpix.cpix4->c0 = pc0;
    cpix.cpix4->c1 = pc1;
    if (HASALPHA(components))    {
        pa0 = c0.a & 0xff;
        pa1 = c1.a & 0xff;
        mask = 0;
        n0 = 0;
        for (i=0; i<TILEAREA; i++)   {
          mask |= (ma[i] << i*2);
          n0 += (ma[i] < 2 ? 1 : 0);
        }
        if (n0 < 8) {
          unsigned char tmpa;
          mask = ~mask;
          tmpa = pa0; pa0 = pa1; pa1 = tmpa;
        }
        cpix.cpix8->mask1 = mask;
        cpix.cpix8->a0 = pa0;
        cpix.cpix8->a1 = pa1;
    }
}
```

```
}
#define ROTATE(a,i,j,k,l) g=a[i][j];h=a[k][l];a[i][j]=g-
s* (h+g*tau); \
a[k][l]=h+s*(g-h*tau);
/* Declare a vector */
float *vector(nl,nh; int nl,nh;{
}
/* Free up space for a vector no longer needed */
void free_vector(v,nl,nh)
float *v; int nl,nh;{
}
/* Declare a matrix */
float **matrix(rl,rh,cl,ch);
int rl,rh,cl,ch;{
}
/* Free up space for a matrix no longer needed */
void free_matrix(m,rl,rh,cl,ch)
float **m; int rl,rh,cl,ch;{
}
/* Calculate the eigenvectors and eigenvalue for a 3x3
 * matrix */
void EigenValues (a,n,d,v,nrot)
float **a,d[ ], **v; int n, *nrot; {
}
/* Sort the eigenvectors in descending order. */
void EigenSort(float *d, float **v, int n) {
}
#undef ROTATE
void findaxes(int m, float *p, float *vec){
    float **a, *w, **v; int nrot, n, i, j, ind;
    float px, py, pz, err;
    n = 3; a = matrix(1,n,1,n);
    w = vector(1,n); v = matrix(1,n,1,n);
    a[1][1] = a[1][2] = a[1][3] = 0.0;
    a[2][1] = a[2][2] = a[2][3] = 0.0;
    a[3][1] = a[3][2] = a[3][3] = 0.0;
    ind = 0;
    for( j=0; j<m; j++ )    {
        px = p[ind++];
        py = p[ind++];
        pz = p[ind++];
        a[1][1]+= px*px;
        a[1][2] += px*py;
        a[1][3] += px*pz;
        a[2][2] += py*py;
        a[2][3] += py*pz;
        a[3][3] += pz*pz;
    }
    a[2][1] = a[1][2];
    a[3][1] = a[1][3];
    a[3][2] = a[2][3];
    EigenValues(a,n,w,v, &nrot);
    EigenSort(w, v, n);
    vec[0] = v[1][1]; vec[1] = v[2][1]; vec[2] = v[3][1];
    free_vector(w,1,n); free_matrix(a,1,n,1,n);
    free_matrix (v,1,n,1,n);
}
void
DoCollapse(Colorf *c, int n, float m[3][3], float
im[3][3], Colorf *mean) {
    float *P;
    float v[3];
    int i;
    float mr,mg,mb;
    p = (float *) c;
/* compute the mean of red, green and blue */
    mr = 0; mg = 0; mb = 0;
    for (i=0; i < n; i++) {
        mr += c[i].r;
        mg += c[i].g;
        mb += c[i].b;
    }
    mr /= n;
    mg /= n;
    mb /= n;
    mean->r = mr;
    mean->g = mg;
    mean->b = mb;
/* find the principal axis and rotate it to lie on the
```

APPENDIX A-continued

```
 * red axis */
    for (i=0; i < n; i++) {
        c[i].r = c[i].r - mr;
        c[i].g = c[i].g - mg;
        c[i].b = c[i].b - mb;
    }
    findaxes(n,p,v);
    FindRot(v,m,-1.);
    FindRot(v,im,1.);
    DoRotate(n,c,m);
    for (i=0; i< n; i++) {
        c[i].g = 0;
        c[i].b = 0;
    }
}
void
DoRotate(int n, Colorf *c, float m[3][3]) {
    int i; float x,y,z;
    for (i=0; i < n; i++)   {
        x = c[i].r; y = c[i].g; z = c[i].b;
        c[i].r = x*m[0][0] + y * m[1][0] + z * m[2][0];
        c[i].g = x*m[0][1] + y * m[1][1] + z * m[2][1];
        c[i].b = x*m[0][2] + y * m[1][2] + z * m[2][2];
    }
}
void
FindRot(float v[3], float m[3][3], float scale) {
    float cy,sy,cz,sz,lxz,lxy;
    float temp[3];
    lxz = sqrt(v[0] * v[0] + v[2] * v[2]);
    if (lxz == 0) {
        cy = 1;
        sy = 0;
    } else {
        cy = v[0] / lxz;
        sy = scale * (v[2] / lxz);
    }
    lxy = sqrt(lxz*lxz + v[1] * v[1]);
    if (lxy == 0) {
        cz = 1;
        sy = 0;
    } else {
        cz = lxz / lxy; sz = scale *(v[1] / lxy);
    }
    if (scale < 0)
        m[0][0] = cy * cz;m[0][1] = cy * sz;m[0][2]=-sy;
        m[1][0] = -sz; m[1][1] = cz; m[1][2] = 0;
        m[2][0] = -sy * cz; m[2][1]=-sy * sz;m[2][2]=cy;
    } else {
        m[0][0] = cz*cy; m[0][1]= sz; m[0][2]=cz * sy;
        m[1][0] = -sz*cy; m[1][1]= cz; m[1][2]=sz * sy;
        m[2][0] = -sy ; m[2][1]= 0; m[2][2]=cy;
    }
}
/* The compressed.h include file used by the compression
 * software. */
#define HASALPHA(components)     ((components) == 2 ||
(components) == 4)
#define HASRGB(components)       ((components) == 3 ||
(components) == 4)
#define TILESIZE 4 /* width and height of a ccc tile */
#define TILEAREA (TILESIZE*TILESIZE)
/*pixels per CCC tile */
#define TILEBYTES(cmps) (HASALPHA(cmps) ? sizeof(Comp8)
: sizeof(Comp4))
typedef struct {
    int r, g, b, a;
} Color;
typedef struct {
    float r, g, b;
} Colorf;
typedef struct {
    unsigned int mask0;
    unsigned short c0;
    unsigned short c1;
} Comp4;
typedef struct {
    unsigned int mask0;
    unsigned short c0;
    unsigned short c1;
    unsigned int mask1;
    unsigned char a0;
    unsigned char a1;
    unsigned short pad;
} Comp8;
typedef union {
    Comp4 *cpix4;
    Comp8 *cpix8;
    void *data;
} Comp;
typedef struct {
    int magic;
    int w;
    int h;
} CompHeader;
```

What is claimed is:

1. A method of compressing a color cell having a plurality of pixels, comprising the steps of:
   (1) determining a luminance value (Y) for each pixel of the color cell;
   (2) selecting a maximum luminance value ($Y_{MAX}$) and a minimum luminance value ($Y_{MIN}$) for the color cell;
   (3) subdividing the luminance interval $Y_{MAX}$ to $Y_{MIN}$ into luminance subintervals;
   (4) generating at least one luminance-encoded bitmask that associates each pixel of the color cell with one respective luminance subinterval; and
   (5) determining a representative color value for each luminance subinterval from the pixels of the color cell associated with the luminance subinterval.

2. The method of claim 1, wherein step (3) comprises the step of subdividing the interval $Y_{MAX}$ to $Y_{MIN}$ into two approximately equal subintervals.

3. The method of claim 2, wherein step (3) comprises the step of subdividing into a first subinterval $Y_{MAX}$ to $0.5(Y_{MAX}+Y_{MIN})$ and a second subinterval as $0.5(Y_{MAX}+Y_{MIN})$ to $Y_{MIN}$.

4. The method of claim 3, wherein step (4) comprises the step of generating one bitmask for the color cell, the bitmask having a plurality of entries each associating one of the pixels of the color cell with one subinterval.

5. The method of claim 4, wherein step (5) comprises the step of determining two average color values, a first color value that is the average color value of all the pixels associated with the first subinterval and a second color value that is the average color value of all the pixels associated with the second subinterval.

6. The method of claim 5, further comprises the step of:
   (6) converting the first and second average color values to an RGB565 format.

7. The method of claim 6, further comprises the step of:
   (7) appending the first and second average color values to the bitmask for transmission over a network.

8. The method of claim 1, wherein step (3) comprises the step of subdividing the interval $Y_{MAX}$ to $Y_{MIN}$ into four approximately equal subintervals.

9. A method of compressing a color cell having a plurality of pixels, comprising the steps of:
   (1) determining a luminance value (Y) for each pixel of the color cell;
   (2) selecting a maximum luminance value ($Y_{MAX}$) and a minimum luminance value ($Y_{MIN}$) for the color cell;
   (3) subdividing the interval $Y_{MAX}$ to $Y_{MIN}$ into subintervals;

(4) generating at least one bitmask that associates each pixel of the color cell with one respective subinterval; and (5) determining a representative color value for each subinterval from the pixels of the color cell associated with the subinterval;

wherein step (3) comprises the step of subdividing the interval $Y_{MAX}$ to $Y_{MIN}$ into four approximately equal subintervals; and wherein step (3) comprises the step of subdividing into first through fourth subintervals, wherein the first subinterval is $Y_{MAX}$ to $0.25(3Y_{MAX}+Y_{MIN})$, the second subinterval is $0.25(3Y_{MAX}+Y_{MIN})$ to $0.5(Y_{MAX}+Y_{MIN})$, the third subinterval is $0.5(Y_{MAX}+Y_{MIN})$ to $0.25(Y_{MAX}+3Y_{MIN})$, and the fourth subinterval is $0.25(Y_{MAX}+3Y_{MIN})$ to $Y_{MIN}$.

10. The method of claim 9, wherein step (4) comprises the step of generating two bitmasks for the color cell, a first bitmask having a plurality of entries that contain a most significant bit (MSB) and a second bitmask having a plurality of entries that contain a least significant (LSB), and wherein a combined MSB and LSB associates one of the pixels of the color cell with one subinterval.

11. The method of claim 10, wherein step (5) comprises the step of determining four average color values, a first color value that is the average color value of all the pixels associated with the first subinterval, a second color value that is the average color value of all the pixels associated with the second subinterval, a third color value that is the average color value of all the pixels associated with the third subinterval, and a fourth color value that is the average color value of all the pixels associated with the fourth subinterval.

12. The method of claim 11, further comprises the step of:

(6) converting the first, second, third, and fourth average color values to an RGB565 format.

13. The method of claim 12, further comprises the step of:

(7) appending the first, second, third, and fourth average color values to the first and second bitmasks for transmission over a network.

14. The method of claim 1, wherein said steps (1) through (5) are performed in a real-time rate.

15. A distributed graphics system, comprising:

means for compressing color cells for transmission over a network, each said color cell having a maximum luminance value ($Y_{MAX}$) and a minimum luminance value ($Y_{MIN}$), said means comprises a module that subdivides said color cells into a first through fourth subinterval, the first subinterval being $Y_{MAX}$ to $0.25(3Y_{MAX}+Y_{MIN})$, the second subinterval being $0.25(3Y_{MAX}+Y_{MIN})$ to $0.5(Y_{MAX}+Y_{MIN})$, the third subinterval being $0.5(Y_{MAX}+Y_{MIN})$ to $0.25(Y_{MAX}+3Y_{MIN})$, and the fourth subinterval being $0.25(Y_{MAX}+3Y_{MIN})$ to $Y_{MIN}$; and means for decoding the compressed color cells for display at a computer.

16. The distributed graphics system of claim 15, further comprising:

means for rendering an image; and means for dividing the rendered image into color cells.

17. A computer readable medium storing a computer program for compressing a color cell having a plurality of pixels, comprising:

means for determining a luminance value (Y) for each pixel of the color cell;

means for selecting a maximum luminance value ($Y_{MAX}$) and a minimum luminance value ($Y_{MIN}$) for the color cell;

means for subdividing the luminance interval $Y_{MAX}$ to $Y_{MIN}$ into luminance subintervals;

means for generating at least one luminance-encoded bitmask that associates each pixel of the color cell with one respective luminance subinterval; and means for determining a representative color value for each luminance subinterval from the pixels of the color cell associated with the luminance subinterval.

18. The computer readable medium storing a computer program of claim 17, wherein said means for subdividing further comprises means for subdividing the luminance interval $Y_{MAX}$ to $Y_{MIN}$ into two approximately equal subintervals.

19. The computer readable medium storing a computer program of claim 17, wherein said means for subdividing further comprises for subdividing the luminance interval $Y_{MAX}$ to $Y_{MIN}$ into four approximately equal subintervals.

20. The computer readable medium storing a computer program of claim 17, further comprising a means for performing the color cell at a real-time rate.

* * * * *